United States Patent

Lemelson et al.

[11] Patent Number: 5,993,194
[45] Date of Patent: Nov. 30, 1999

[54] AUTOMATICALLY OPTIMIZED COMBUSTION CONTROL

[76] Inventors: Jerome H. Lemelson, Suite 286, Unit 802 930 Tahoe Blvd., Incline Village, Nev. 89451-9436; Robert D. Pedersen, 7808 Glen Eagle, Dallas, Tex. 75248; John H. Hiett, 1115 E. Lemon St., #419, Tempe, Ariz. 85281

[21] Appl. No.: 08/668,383
[22] Filed: Jun. 21, 1996
[51] Int. Cl.⁶ .................................................. F23N 5/02
[52] U.S. Cl. .................. 431/14; 431/75; 431/76; 431/78; 431/79; 356/45; 356/418; 382/100; 706/23; 706/16; 364/148.02
[58] Field of Search ................... 431/75, 14, 76, 431/78.79; 395/22, 24, 900; 382/1, 100; 356/45, 418; 358/100; 364/148.02; 706/23, 16

[56] References Cited

U.S. PATENT DOCUMENTS

| | | | |
|---|---|---|---|
| 4,410,266 | 10/1983 | Seider | 356/45 |
| 4,881,505 | 11/1989 | Tomisawa | 123/480 |
| 4,889,099 | 12/1989 | Tomishawa | 123/489 |
| 4,907,281 | 3/1990 | Hirvonon et al. | 382/100 |
| 4,926,826 | 5/1990 | Nakaniwa et al. | 123/489 |
| 4,966,118 | 10/1990 | Itakura et al. | 123/492 |
| 5,006,992 | 4/1991 | Skeirik | 364/148.02 |
| 5,010,827 | 4/1991 | Kychakoff et al. | 110/185 |
| 5,050,083 | 9/1991 | Uchida et al. | 364/431.05 |
| 5,065,728 | 11/1991 | Nakaniwa | 123/489 |
| 5,129,379 | 7/1992 | Kaneyasu et al. | 123/436 |
| 5,146,898 | 9/1992 | Itakura et al. | 123/492 |
| 5,158,024 | 10/1992 | Tanaka et al. | 110/186 |
| 5,178,002 | 1/1993 | Hanson | 73/117.4 |
| 5,205,486 | 4/1993 | Jung | 236/94 |
| 5,213,077 | 5/1993 | Nishizawa et al. | 123/352 |
| 5,227,975 | 7/1993 | Nakaniwa | 364/431.05 |
| 5,247,445 | 9/1993 | Miyano et al. | 364/431.12 |
| 5,249,954 | 10/1993 | Allen et al. | 431/75 |
| 5,252,060 | 10/1993 | McKinnon et al. | 431/76 |
| 5,257,496 | 11/1993 | Brown et al. | 60/39.06 |
| 5,285,959 | 2/1994 | Nanba et al. | 236/11 |
| 5,303,684 | 4/1994 | Brown et al. | 123/435 |
| 5,305,230 | 4/1994 | Matsumoto et al. | 364/495 |
| 5,311,421 | 5/1994 | Nomura et al. | 364/157 |

(List continued on next page.)

OTHER PUBLICATIONS

Brubaker, "Fuzzy Operators", EDN, Nov. 9, 1995, pp. 239–241.

Cox, "Fuzzy Fundamentals", IEEE Spectrum, Oct. 1992, pp. 58–61.

Jang, Jyh–Shing Roger, Sun, Chen–tsai, "Neuro–Fuzzy Modeling and Control", Proceedings of the IEEE, vol. 83, No. 3, Mar. 1995, pp. 378–406.

Kleppe, John A., "Acoustic Gas Flow Measurement in Large Ducts and Stacks", Sensors, May 1995, p. 18.

Kleppe, John A., "Adpat Acoustic Pyrometer to Measure Flue–gas Flow", Power, Aug. 1995, McGraw–Hill, Inc.

(List continued on next page.)

Primary Examiner—Larry Jones
Attorney, Agent, or Firm—Steven G. Lisa

[57] ABSTRACT

Systems and methods are disclosed that optimize the combustion process in various reactors, furnaces, and internal combustion engines. Video cameras are used to evaluate the combustion flame grade. Depending on the desired form, standard or special video devices, or beam scanning devices, are used to image the combustion flame and by-products. The video device generates and outputs image signals during various phases of, and at various locations in, the combustion process. Other forms of sensors monitor and generate data signals defining selected parameters of the combustion process, such as air flow, fuel flow, turbulence, exhaust and inlet valve openings, etc. In a preferred form, a neural networks initially processes the image data and characterizes the combustion flame. A fuzzy logic controller and associated fuzzy logic rule base analyzes the image data from the neural network, along with other sensor information. The fuzzy logic controller determines and generates control signals defining adjustments necessary to optimize the combustion process.

38 Claims, 14 Drawing Sheets

U.S. PATENT DOCUMENTS

| | | | |
|---|---|---|---|
| 5,361,628 | 11/1994 | Marko et al. | 73/116 |
| 5,416,888 | 5/1995 | Shimokawa | 706/16 |
| 5,430,642 | 7/1995 | Nakajima et al. | 364/148 |
| 5,465,320 | 11/1995 | Enbutsu et al. | 706/23 |
| 5,471,937 | 12/1995 | Kosky et al. | 110/345 |
| 5,473,162 | 12/1995 | Busch et al. | 250/341.6 |
| 5,479,358 | 12/1995 | Shimoda et al. | 364/492 |
| 5,510,772 | 4/1996 | Lasenby | 340/578 |
| 5,664,066 | 9/1997 | Sun et al. | 703/25 |

OTHER PUBLICATIONS

Kleppe, John A., "High–Temp Gas Measurement Using Acoustic Pyrometry", *Sensors*, Jan. 1996, pp. 17–22.

Kleppe, John A., "The Application of Acoustic Pyrometry to Orimulsion Fired Boilers", Scientific Engineering Instruments, Inc., Sparks, Nevada, USA.

Kosko, Isaka, "Fuzzy Logic", *Scientific American*, Jul. 1993, pp. 76–81.

Lippmann, Richard P., "An Introduction to Computing with Neural Nets", IEEE ASSP Magazine, Apr. 1987, pp. 4–22.

Mendel, Jerry M., "Fuzzy Logic Systems for Engineering: A Tutorial", Proceedings of the IEEE, vol. 83, No. 3, Mar. 1995, pp. 345–377.

Schwartz, Klir, "Fuzzy Logic Flowers in Japan", IEEE Spectrum, Jul. 1992, pp. 32–35.

Shiraishi, Hitoshi, "CMAC Neural Network Controller for Fuel–Injection Systems", IEEE Transactions on Control Systems Technology, vol. 3, No. 1, Mar. 1995, pp. 32–37.

Scanning the Issue on: Neural Networks, II: Analysis, Techniques, & Applications, Proceedings of the IEEE, vol. 78, No. 10, Oct. 1990.

Widrow, Lehr, "30 Years of Adaptive Neural Networks: Perceptron, Madaline, and Backpropagation", Proceedings of the IEEE, vol. 78, No. 9, Sep. 1990, pp. 1415–1442.

Gottwald, Siegred, *Fuzzy Sets & Fuzzy Logic: The Foundation of Application—From a Mathematical Point of View*, Vrueg & Sohn, Braunschweig Wiesboden (1993), ISBN 3–528–05311–9. pp. 133–168.

McNeil, Daniel, *Fuzzy Logic*, Simon & Schultz, New York (1993), ISBN 0–671–7043. pp. 101–126.

*Fuzzy Logic Technology & Application*. pp. 107–108, 261–266.

Bosacchi, Bruno, Bezdek, James, C. *Application of Fuzzy Logic Technology*, vol. 2061, SPIE (1993). pp. 8–26, 122–139.

*Progress in Emission Control Technologies*, Society of Automotive Engineers, Inc. 1994. pp. 111–115, 117–126, 239–246.

*Advanced Emission Control Technologies*, Society of Automotive Engineers, Inc., 1993. pp. 17–32, 83–92, 147–156.

*Combustion Fundamentals*, Roger A. Strehlow, McGraw–Hill Book Company, 1984. pp. 25–49, 469–479.

*Combustion and Pollution Control in Heating Systems*, Hanby Springer–Verlag London Limited, 1994. pp. 7–20, 36–46, 78–88, 103–117.

*An Introduction to Combustion*, Warren C. Strahle, Gordon and Breach Science Publishers, 1993. pp. 129–140.

*Laser Probes for Combustion Chemistry*, David R. Crosley, ACS Symposium Series, American Chemical Society, Washington D.C., 1980. pp. 3–19, 413–426.

*Laser Diagnostics for Combustion Temperature and Species*, Alan C. Eckbreth, Abacus Press, tunbridge Wells, Kent & Cambridge, Mass. 1988. pp. 1–26.

*Flame and Combustion*, J.A. Barnard, J.N. Bradley, London, New York, Chapman and Hall, 1985. pp. 113–130, 266–288.

AUTOMATICALLY OPTIMIZED COMBUSTION CONTROL

FIELD OF THE INVENTION

This invention relates to systems and methods for automatically controlling and optimizing a combustion process to maintain high combustion efficiency while also minimizing pollutants and other harmful by-products. More specifically, this invention uses an expert system fuzzy logic controller and a neural network to analyze various forms of data gathered from image and other sensors, and to optimize the combustion process by automatically varying combustion control parameters.

BACKGROUND

Combustion plants, furnaces and engines of various forms are well known. They are used to heat homes, cook food, power factories, and to propel many different types of vehicles. Combustion systems evolved through the centuries from simple open fires to modern centralized boilers and hot air furnaces. Combustion machines used to power vehicles include steam engines, piston engines, turbines, jet engines and rockets. Large-scale combustion plants generate electrical power to provide power for communities and cities.

The combustion process, itself, is also well known. In general, most combustion systems operate by burning a wide variety of hydrocarbon fuels, including natural gas, oil, coal and refuse. As such, the combustion process is an exothermic, or heat producing, chemical reaction between a fuel and oxygen. A high temperature is used to ignite the reaction, which causes burning of the air and fuel reactants. The burning process converts the hydrocarbon fuel and oxygen to carbon dioxide, water and other combustion byproducts. The combustion process breaks the molecular bond structure of the reactants, and yields combustion products that are at a lower thermodynamic potential energy than the original reactants. The change in potential energy level generates kinetic energy in the form of heat, which is used as a source of power. For additional background information regarding the combustion process, see the following publications, each of which is incorporated herein by reference: Strahle, Warren C., *An Introduction to Combustion,* Gordon and Breach Science Publishers, S.A., Longhorne, Pa. (1993), ISBN 2-88124-586-2; Strehlow, Roger A., *Combustion Fundamentals,* McGraw-Hill, New York (1984), ISBN 0-07-062221-3; Barnard, J. A., *Flame and Combustion,* Chapman and Hall, New York (1985), ISBN 0-412-23030-5.

There has been much innovation in the development of modern combustion plants and engines. However, the proliferation and size of all kinds of combustion plants is a source of increasing environmental concern. For example, environmental problems traced to combustion power plants are now better understood, including specifically relating to effects such as smog, acid rain, global warming and depleting combustible natural resources. As a result, attention has been directed at improving the combustion process with the goals of increasing efficiency and minimizing negative side effects and byproducts. Examples of such attempts are found in the following U.S. Pat. Nos. (a) 5,479,358; (b) 5,473,162; (c) 5,471,937; (d) 5,430,642; (e) 5,361,628; (f) 5,311,421; (g) 5,305,230; (h) 5,303,684; (i) 5,285,959; (j) 5,257,496; (k) 5,249,954; (l) 5,247,445; (m) 5,227,975; (n) 5,213,077; (o) 5,205,486; (p) 5,178,002; (q) 5,158,024; (r) 5,146,898; (s) 5,129,379; (t) 5,065,728; (u) 5,050,083; (v) 4,966,118; (w) 4,926,826; (x) 4,889,099; and (y) 4,881,505. See also the following publications: (a) *Progress in Emission Control Technologies,* Society of Automotive Engineers (1994), ISBN 1-56091-565-X; (b) *Advanced Emission Control Technologies,* Society of Automotive Engineers (1993), ISBN 1-56091-436-X; (c) Hanby, V. I., *Combustion and Pollution Control in Heating Systems,* Springer Verlag, New York (1993), ISBN 3-540-19849-0; (d) Eckbreth, Alan C., *Laser Diagnostics for Combustion Temperature and Species,* Abacus Press, Cambridge Mass. (1988), ISBN 0-85626-344-3; and (e) Crosley, David R., *Laser Probes for Combustion Chemistry,* American Chemical Society Symposium Series, American Chemical Society, Washington, D.C. (1980), ISBN 0-8412-0570-1. Each of the above-listed patents and publications is incorporated herein by reference.

While the above-listed patents and publications disclose various attempts to characterize and control the combustion process, none of them take full advantage of modern imaging and control technology. For example, none of the systems combine modern computer imaging techniques with expert systems using fuzzy logic and neural networks to optimize the combustion process through automatic feedback control of the combustion parameters. The need exists for improved systems and methods that automatically optimize the combustion process to increase efficiency and minimize unwanted or harmful by-products. In view of the wide spread use of combustion systems that burn hydrocarbon fuels, even small improvements in the efficiency of the combustion process can result in significant social and environmental benefits.

OBJECTS OF INVENTION

It is an object of the invention to provide automatic combustion optimization systems and methods that improve combustion efficiency and lower pollutant emissions.

It is another object of the invention to provide improved combustion control systems and methods that combine image analysis and sensing of other combustion parameters to automatically optimize the combustion process using expert systems implemented with fuzzy logic and neural networks.

It is another object of the invention to automatically generate combustion control signals by analyzing video signals resulting from scanning the combustion process.

It is another object of the invention to provide automatic combustion control systems and methods that generate signals for analysis by using laser scanners to scan a combustion chamber and combustion exhaust gases.

It is another object of the invention to provide automatic combustion control systems and methods that analyze video scanning signals to evaluate the concentration of reactants and the quality of the combustion flame, and that generate feedback control signals based on such as an evaluation.

It is a another object of the invention is to automatically analyze combustion temperature and video and laser scanning signals to control and optimize the combustion process.

It is another object of this invention is to provide automatic combustion optimization systems and methods using neural networks to analyze image signals and classify characteristics of the combustion process, such as flame grade.

It is another object of the invention to provide automatic combustion optimization systems and methods using a fuzzy logic controller to analyze a variety of sensor outputs, including flame grade classification determined from image analysis.

It is another object of the invention to provide a fuzzy logic rule base useful for analyzing a variety of parameters to optimize the combustion process.

It is another object of the invention to provide a fuzzy logic rule base and associated expert system that analyze and respond to changes in a variety of combustion parameters to control and optimize the combustion process.

It is another object of the invention to provide automatic combustion optimization systems and methods that compensate for inaccuracies and uncertainties in image signals and other sensor outputs that are used to measure volatile combustion processes.

It is another object of the invention to provide systems and methods that automatically monitor and control the combustion process for optimal operation in a "lean" burn region.

It is another object of the invention to provide systems and methods that automatically monitor and control both the fuel and air flow rates into a combustion chamber.

It is another object of the invention to provide automatic combustion optimization systems and methods that adjust the air to fuel ratio to maintain combustion parameters within a "window" or region about specified set points.

It is another object of the invention to provide automatic combustion optimization systems and methods that use a fuzzy logic controller to minimize the emissions of nitric oxides and/or other pollutants while still maintaining an efficient and adequate rate of combustion.

It is another object of the invention to provide systems and methods that automatically monitor and control the rate of turbulence in the inlet and combustion chamber to improve the overall combustion process.

Further objects of the invention are apparent from reviewing the Summary of the Invention, Detailed Description and appended claims, which are each set forth below.

SUMMARY OF THE INVENTION

The above and other objects are achieved in the present inventions, which provide automatic combustion control systems and methods implementing neural networks to analyze video data resulting from scanning or imaging various aspects of the combustion process. Additional sensors monitor and generate input signals that define other parameters of the combustion process, such as fuel flow, air flow, air to fuel ratio, inlet turbulence and combustion turbulence. An expert computer system uses a fuzzy logic rule base to analyze the various data inputs and to determine if any adjustments are necessary to optimize the combustion process. The expert system automatically generates feedback control signals to vary the combustion parameters to maintain optimal combustion efficiency while minimizing fuel use and the generation of harmful byproducts.

The control systems and methods of the present inventions optimize the combustion process in a furnace, incinerator, internal combustion engine or reactor. Computer image analysis or machine vision techniques implementing neural networks analyze video data resulting from scanning parameters of the combustion process, such as flame and fireball structure. Detected variations in the combustion parameters, such as the shapes, sizes and propagation of flame and fireball, are analyzed to determine and characterize combustion efficiencies. Adjustments to the combustion parameters are automatically implemented to optimize burning and reduce or eliminate pollution.

The preferred embodiments of the inventions are described below in the Figures and Detailed Description. Unless specifically noted, it is applicant's intention that the words and phrases in the specification and claims be given the ordinary and accustomed meaning to those of ordinary skill in the applicable art(s). If applicant intends any other meaning, he will specifically state that he is applying a special meaning to a word or phrase.

Likewise, applicant's use of the word "function" in the Detailed Description is not intended to indicate that he seeks to invoke the special provisions of 35 U.S.C. Section 112, ¶ 6 to define his invention. To the contrary, if applicant wishes to invoke the provisions of 35 U.S.C. Section 112, ¶ 6 to define his invention, he will specifically set forth in the claims the phrases "means for" or "step for" and a function, without also reciting in that phrase any structure, material or act in support of the function. Moreover, even if applicant invokes the provisions of 35 U.S.C. Section 112, ¶ 6 to define his invention, it is applicant's intention that his inventions not be limited to the specific structure, material or acts that are described in his preferred embodiments. Rather, if applicant claims his invention by specifically invoking the provisions of 35 U.S.C. Section 112, ¶ 6, it is nonetheless his intention to cover and include any and all structures, materials or acts that perform the claimed function, along with any and all known or later developed equivalent structures, materials or acts for performing the claimed function.

For example, the present inventions generate image information for analysis by scanning the combustion process using any applicable image or video scanning system or method. The inventions described herein are not to be limited to the specific scanning or imaging devices disclosed in the preferred embodiments, but rather, are intended to be used with any and all applicable electronic scanning devices, as long as the device can generate an input signal that can be analyzed by a computer to detect variations in the combustion process or characteristics. Thus, the scanners or image acquisition devices are shown and referenced generally throughout this disclosure, and unless specifically noted, are intended to represent any and all devices appropriate to scan or image the combustion process.

Likewise, it is anticipated that the physical location of the scanning device is not critical to the invention, as long as it can scan or image the combustion flame. Thus, the scanning device can be configured to scan the combustion process either directly or through a high temperature resistant window or transparent wall of the combustion chamber. Alternatively, the scanning device may scan or image the combustion process using a light pipe, such as a fiber-optic bundle extending to or through an opening in the combustion chamber wall and terminating within or adjacent the combustion region. Accordingly, the words "scan" or "image" as used in this specification should be interpreted broadly and generically.

Further, there are disclosed several computers or controllers, that perform various control operations. The specific form of computer is not important to the invention. In its preferred form, applicant divides the computing and analysis operations into several cooperating computers or microprocessors. However, with appropriate programming well known to those of ordinary skill in the art, the inventions can be implemented using a single, high power computer. Thus, it is not applicant's intention to limit his invention to any particular form of computer.

Further examples exist throughout the disclosure, and it is not applicant's intention to exclude from the scope of his invention the use of structures, materials or acts that are not expressly identified in the specification, but nonetheless are capable of performing a claimed function.

BRIEF DESCRIPTION OF THE DRAWINGS

The inventions of this application are better understood in conjunction with the following drawings and detailed description of the preferred embodiments. The various hardware and software elements used to carry out the inventions are illustrated in the attached drawings in the form of block diagrams, flow charts, and neural network and fuzzy logic algorithms and structures.

The above Figures are better understood in connection with the following detailed description of the preferred embodiments.

DETAILED DESCRIPTION

Figure 1:
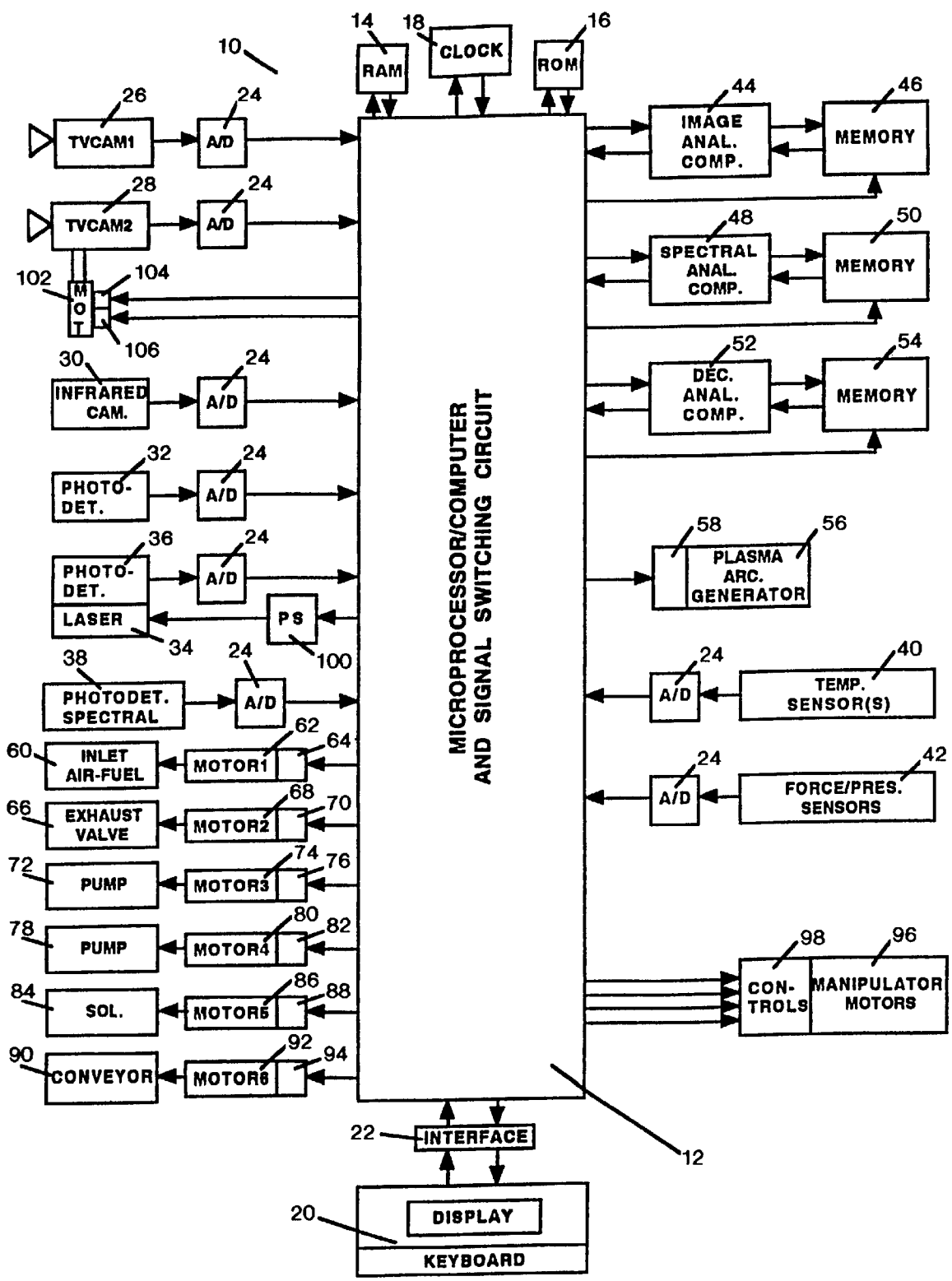
FIG. 1 is a block diagram of a combustion monitoring and control system applicable to, for example, furnaces, incinerators, internal combustion engines and the like, wherein sensor and computer image data are automatically analyzed to monitor and optimize the combustion process.

FIG. 1 shows a block diagram of a system 10 for monitoring and controlling a combustion process in accordance with the present inventions. The system 10 and the methods that use it automatically monitor and adjust combustion variables to optimize the combustion process.

The system 10 includes a computer controller and signal switching circuit 12. The computer controller 12 includes associated random access memory (RAM) 14, read only memory (ROM) 16 and clock 18. The controller 12 also includes a keyboard and display 20, and an associated interface 22. Each of those individual components is well known in the prior art, and it is expressly noted that any and all applicable components can be used. For example, depending on the application, the computer controller 12 can take the form of one or more microprocessors, desktop computers, mainframe computers, or application specific integrated circuits. Thus, even though FIG. 1 depicts the controller 12 as a single block of the diagram, it is not intended to be limited to any specific structure or form.

As also shown in FIG. 1, numerous different sensors monitor the many combustion parameters and input data to the controller 12 through standard analog to digital (A/D) convertors depicted generally by the blocks 24. The specific selection and configuration of the sensors can vary depending on the type of combustion system that is monitored. In the embodiment of FIG. 1, multiple image-based sensors are employed, including video or television cameras 26 and 28, infrared camera 30, photodetector 32, laser 34 and associated laser detector 36, and spectral photodetector 38. Also shown are temperature sensors 40 and force and pressure sensors 42. If desired, additional sensors of varying types can be added or substituted for those set forth in FIG. 1. Further, as with the components of the controller 12, the A/D convertor 24 and each of the sensors are individually well known in the prior art, and it is expressly noted that any and all applicable sensors can be used. For example, depending on the application, the video or television cameras can take the form of CCD or beam scanners, and the temperature sensing may include the use of acoustic pyrometry. For further information on using acoustic pyrometry, see the following references, each of which is incoporated herein by reference: Kleppe, John A., "High-Temp Gas Measurement Using Acoustic Pyrometry", *Sensors,* January 1996, pgs. 17–22; Kleppe, John A., "Adapt Acoustic Pyrometer to Measure Flue-gas Flow", *Power* August 1995, McGraw-Hill, Inc.; Kleppe, John A., "The Application of Acoustic Pyrometry to Orimulsion Fired Boilers", *Scientific Engineering Instruments. Inc.,* Sparks, Nev., USA; Kleppe, John A., "Acoustic Gas Flow Measurement in Large Ducts and Stacks", *Sensors,* May 1995, pg. 18. Moreover, multiple numbers of each type of sensor can be used. Likewise, as discussed further below, placement of the sensors can vary. For example, the sensors can be located before, within and downstream of the combustion reaction zone or zones.

As described in greater detail below, appropriately selected types of image-based sensors 26, 28, 30, 32, 36 and 38 variously scan or image the combustion flame and associated combustion by-products, and generate output or image signals defining different characteristics, such as: the combustion flame and fireball temperature, shape, size, and color; flame and fireball movement; variations in the locations, shapes and movements of flame fronts; the composition, distribution and quantities of the fuel(s) and material(s) being burned; and the by-products of the combustion reaction. The image signals or data from the sensors are converted to digital form by A/D convertors 24, for input to controller 12.

Overall system operation is controlled by the central microprocessor or computer and signal switching circuit 12 which controls the routing of digital information signals under the control of a clock 18 to and from RAM 14, ROM 16 and the various sensors and subsystems. In the preferred embodiment, several computer subsystems are coupled to the central controller 12 to more efficiently process data. Specifically, an image signal analyzing computer 44 (with attendant memory 46), and a spectral or spectroscopic signal analyzing computer 48 (with memory 50) separately analyze the data received from the image-based sensors. A decision analysis computer 52 analyzes the data generated by the image and spectral analysis computers 44 and 48, and data from controller 12, to monitor, quantify and optimize the combustion process.

As discussed above, one or more appropriate imaging or scanning devices are used to generate the input data for the image 44 and spectral 48 analysis computers. In the preferred embodiment of FIG. 1, a first camera 26 is fixedly mounted relative to the furnace or reactor 124 (shown in FIG. 3). The camera 26 operates to selectively or continuously scan the combustion process, and generates analog video signals. If the camera 26 is a television camera, the analog video signals may be output in the form of NTSC standard full frame television signals. The analog video signals output from camera 26 are converted to digital from by a standard analog-to-digital (A/D) converter 24. The digital video signals output from converter 24 are input to the computer and signal switching circuit 12, and then routed to image analysis computer 44 or spectral analysis computer 46. The image analysis computer 44, or the spectral analysis computer 46, analyze the digital image data to determine and quantify characteristics of the combustion process. As discussed in greater detail below, the analysis computer 44 employs neural network electronics to analyze the image data generated by the camera 26, and generate digital codes that are input to the decision analysis computer 52.

Figure 2:
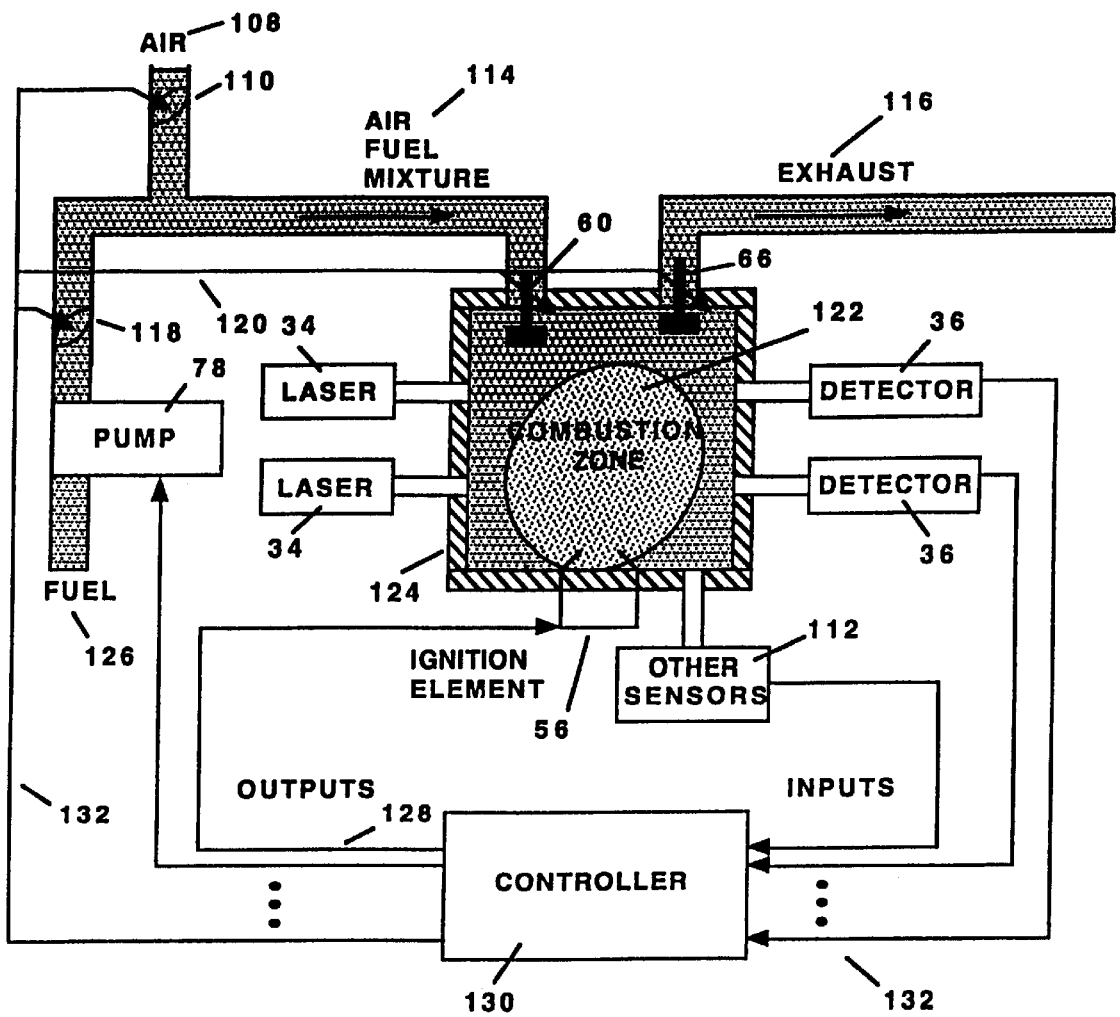
FIG. 2 is a block diagram of a combustion monitoring and control system employing scanners, such as video cameras, laser scanners and photoelectric detectors, to scan and analyze the combustion process and gases or particles defining the products of combustion.

A second camera 28 is shown in FIG. 1 as a video or television camera that is mounted so that its scanning parameters are controllably varied depending on the nature of the combustion process, the combustion variables detected, and the type of control to be effected. For example, the camera 28 is shown as a television camera mounted on a rotating pedestal that is controlled to scan for select periods of time along different scanning axes. One or more of the computers 12, 44, 48 or 52, or a timer (not shown), generate signals 104 and 106 to control a motor 102 to operate in clockwise or counterclockwise directions to selectively vary the scanning axis of camera 28. Thus, camera 28 is controlled to scan different parts of the reaction or combustion chamber 124 (FIG. 2). Alternatively, the camera 28 can be mounted on a robotic arm, or have controls to alter filters, fields of view, or other scanning parameters. As with camera 26, the output of camera 28 is typically in analog form, and is converted to digital form by a standard analog-to-digital converter 24. The digital output from converter 24 is input to computer and signal switching circuit 12, and passed to the appropriate analysis computers 44 or 52.

Other types of imaging devices can be added or substituted for the cameras 26 and 28. For example, in addition to or in place of cameras 26 and 28, an infra-red scanner 30 may be statically or movably mounted relative to the reaction or combustion chamber 124, and used to scan and detect infra-red radiation generated by the combustion process. In a typical form, the infra-red scanner 30 generates analog image signals which are digitized by a standard converter 24. As above, the digital signals output by converter 24 are then directed through controller 12 to one or more of the analyzing computers 44, 48 or 52.

Yet another form of imaging device useful in scanning the combustion process is a photoelectric detector 32 that passes its analog output signal through a standard analog-to-digital converter 24 through computer/switching circuit 12 to one or more of the analyzing computers 44, 48 and 52. Although not shown in FIG. 1, photodetector 32 is preferably mounted in a manner similar to camera 28, so that it can be controlled to detect radiation from selected areas of the combustion region. Alternatively, the photodetector 32 is mounted in a fixed or moveable manner on the wall of, or within, the combustion chamber 124. In still another form, multiple detectors 32 are mounted at selected locations to enable the generation of scanning data from numerous locations.

A fourth type of imaging or scanning system includes a laser 34 and an a cooperating photodetector 36. A standard power supply 100 provides operating power to the laser under control of computer 12. The detector 32 is either statically or movably mounted and controlled to detect reflections and back scatter from laser 34. Laser 34 is mounted relative to the combustion chamber 124 so that it projects its beam through the combustion zone and/or peripheral zones. The detector 36 detects back scatter or reflected radiation, and generates and analog output signal that is modulated with information indicative of the density and shape of particles of burning matter, flames and flame front shape and movement, or fireball size, shape and location. A plurality of such detectors 36 and lasers 34 may be employed to generate image information of higher resolution for computer analysis and control. As above, the analog signal generated from the detectors 36 are converted to digital form by standard A/D converter 24.

In still another form, a detector 38 of spectral information is statically or movably mounted on, above or within the combustion chamber 124, and is employed alone or in combination with one or more similar detectors to scan all or select portions of the combustion zone. An analog output signal is generated from light emitted from the combustion zone as is detected. The output signals are converted to digital form by A/D converter 24, and are passed to the spectral computer 48 by computer or switching circuit 12.

As should be evident from the above discussion, many different kinds of imaging and scanning devices are suitable for use in the invention, as long as the device is useful for detecting and generating signals indicative of pertinent characteristics of the combustion process. In addition, each of the above described scanning devices can be configured to scan not only the combustion process itself, but also incoming fuel and the combustion by-products. In that manner, image information can be provided on the combustion, precombustion and post combustion process in real time for analysis, monitoring and control purposes. Thus, it is not intended that the invention be limited to any specific type of scanning device, mounted in any particular manner.

In addition to generating image data, other sensors of different types are used to generate data of additional pertinent combustion parameters. For example, as shown in FIG. 1, temperature sensors 40 and force or pressure sensors 42 are strategically placed at relevant locations throughout the combustion system (e.g., inlet, combustion and exhaust positions). Each of the temperature and pressure sensors generate either digital signals, or analog signals that are converted to digital form by respective A/D converters 24. The digital temperature and pressure data is passed through controller 12 to the analysis computer 52.

As discussed in greater detail below, the analysis computer 52 is preferably an expert system employing fuzzy logic reasoning to analyze the image and other sensor data to quantify and optimize the entire combustion process. Decision analysis computer 52 generates control signals that selectively vary the combustion parameters to optimize the combustion process. Thus, as shown in FIG. 1, computer 12 is coupled to six motor control circuits 64, 70, 76, 82, 88 and 94 for respective electric or hydraulic motors 62, 68, 74, 80, 86 and 92. Each motor in turn is coupled to and operates one or more control instruments to vary a selected parameter of the combustion process.

For example, motor 62 is controlled to operate one or more air/fuel inlet valves 60 that admit controlled amounts of air or oxygen to the combustion chamber. As described in greater detail below, varying the amount of air and fuel that are introduced to the combustion chamber significantly affects the combustion process. Similarly, motor 68 is coupled to and controls one or more exhaust valves 66. Motors 74 and 80 control pumps 72 and 78, which in turn may be applied to control the admission or exhaust of other reacting gases. Motor 80 is coupled to and controls one or more pumps and/or solenoid valves to admit one or more fuels and/or catalysts or oxygen to one or more locations of the reaction chamber. Motors 92 are similarly controlled to set the speed or operation(s) of one or more conveyors 90 carrying solid fuel, ore, refuge, garbage, or combustion by-product, or other reaction materials to or from the combustion chamber or furnace. Also disclosed are solid fuel manipulators 96 that operate on and/or move solids to be incinerated or otherwise processed in the combustion or reaction chamber 124. The fuel manipulators include associated controller(s) 98, which receive command signals from decision analysis computer 52 and controller 12.

Also included in the combustion control system 10 is a plasma arc or plasma generator 56 which is used to ignite or start the combustion process. The plasma generator 56 includes a interface control 58 that receives command control signals generated by decision computer 52. As directed by the computer 52, arc or plasma generator 56 generates and applies one or more plasma arcs to select locations within the combustion furnace or reaction chamber 124.

Applicant has shown in FIG. 1 several different types of devices that are controlled to vary parameters of the combustion process. It should be understood that the number and particular form of the motors and their associated controls is not critical to the invention, and any and all applicable control systems can be employed under the control of analysis computer 52 and controller/switching circuit 12. Likewise, although the preferred embodiment of FIG. 1 depicts a separate controller 12, image analysis computer 44, spectral analysis computer 48 and decision computer 52, it should be understood that a single large-capacity computer can be used to perform each of the separate operations.

FIG. 2 illustrates in schematic form another embodiment of the combustion control system and method herein disclosed. Combustion takes place in combustion zone 122 within the combustion chamber 124, under control of computer controller 130. For simplification, computer controller 130 is shown in FIG. 2 as a single block, as opposed to the separate computer blocks 12, 44, 48, and 52 shown in FIG. 1. The air-to-fuel (A/F) mixture 114 is injected to the combustion chamber 124 through inlet valve 60, using pump 78 (if necessary). The exhaust 116 and its associated by-products are removed through outlet valve 66. If necessary, an exhaust pump (not shown) may assist in removing the combustion exhaust and by-products. Other combustion control valves and pumps (not shown) may be included. The combustion process is initiated using ignition element 56. Each of the combustion variables (i.e., A/F mixture, inlet/exhaust valves and rates, pumps, ignition, etc.) is controlled by controller 130.

As explained in connection with FIG. 1, as the combustion process proceeds, various sensors acquire and generate data for analysis by the control computer 130. In FIG. 2, multiple lasers 34 and associated sensors/detectors 36 operate to generate image data modulated in accordance with variations in the characteristics of the combustion flame. The remaining sensors are depicted generically in FIG. 2 by block 112. The detectors 36 and other sensors 112 periodically or continuously generate data that is input to the controller 130. As will be described in greater detail below, the controller analyzes the varying data in accordance with a set of rules designed to optimize the combustion process. As the controller detects characteristics that are less than optimum, it selects the particular combustion factor to vary, and automatically generates the necessary control signals 128 to adjust the required parameter. In that manner, the combustion process is continuously monitored and adjusted for optimum performance.

Figure 3:
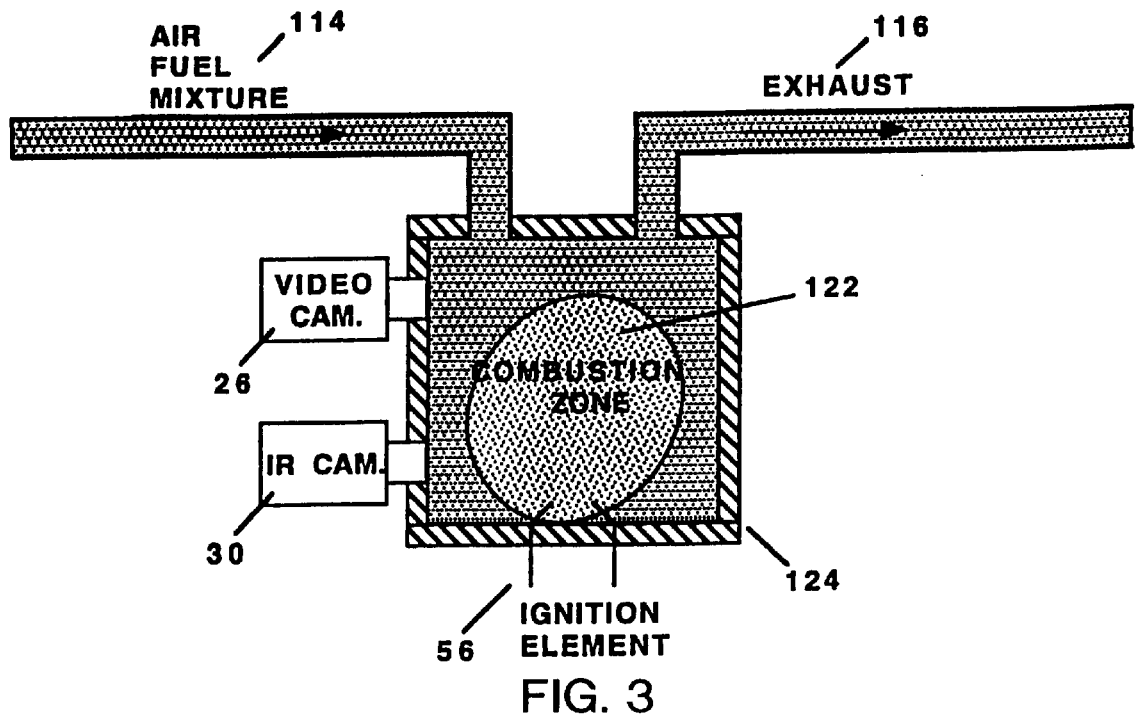
FIG. 3 is a block diagram depicting a furnace or reactor and multiple scanning or imaging devices, such as television and infra-red cameras, adapted to scan the combustion process through an opening or window in the furnace or reactor wall.
Figure 4:
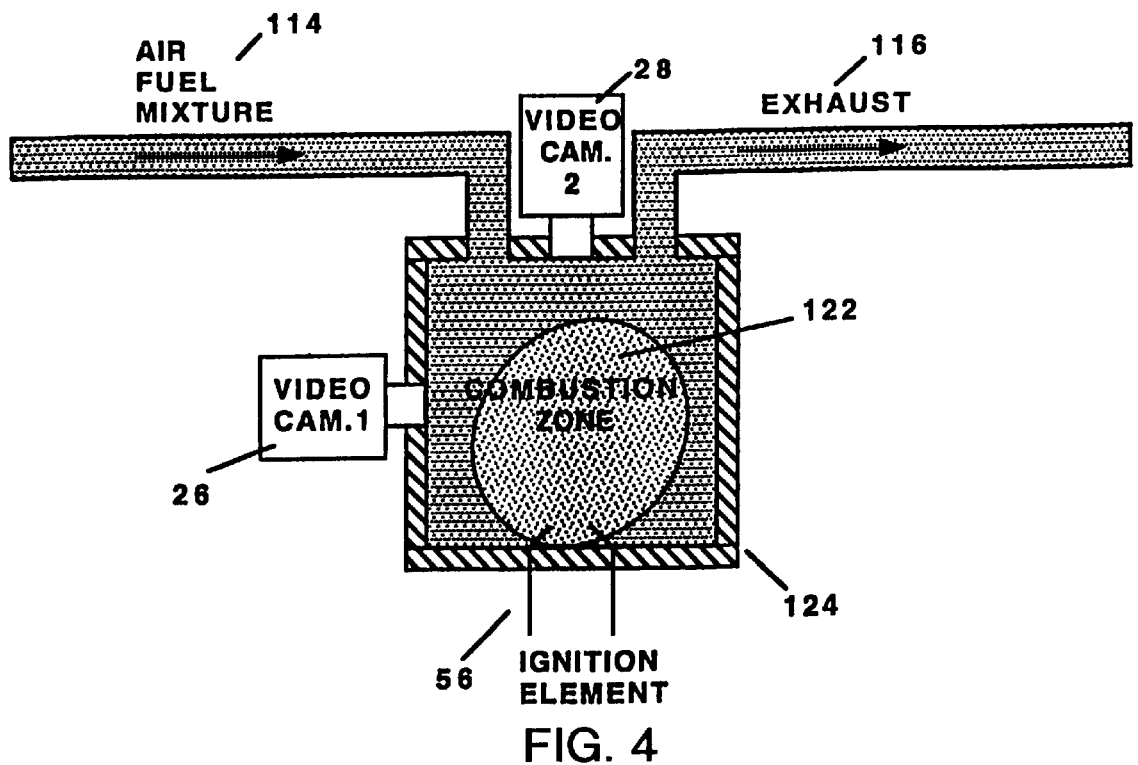
FIG. 4 is a block diagram depicting an alternative configuration for multiple scanners or imaging devices adapted to simultaneously scan the combustion process from two directions.
Figure 5:
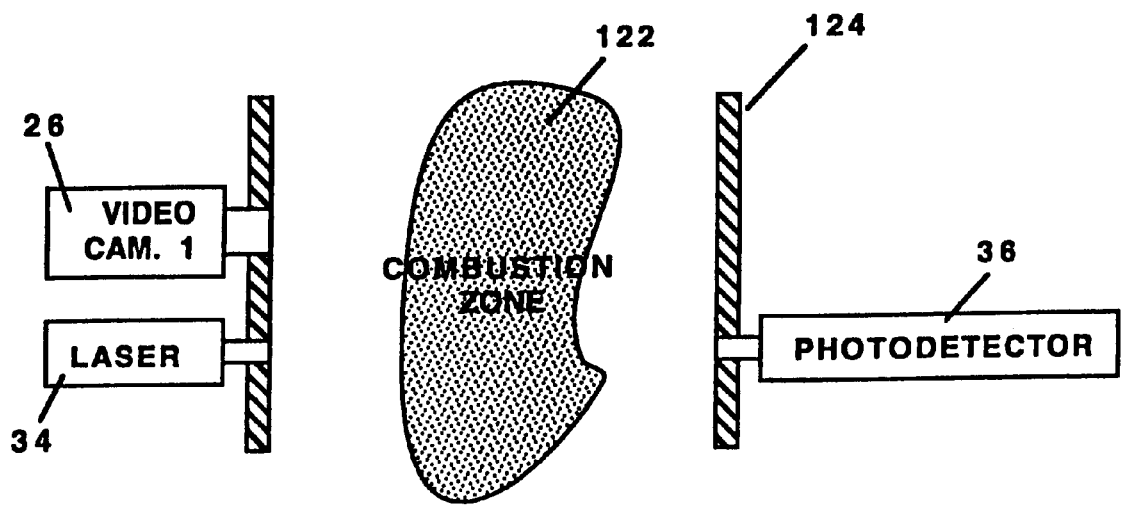
FIG. 5 is a side view depicting part of a reaction chamber or furnace with a portion of a side wall removed to show a first electronic imaging or television camera operable to scan the flame, fireball or plasma images in the combustion zone, and a second spectral scanning system involving a laser and photoelectric detector to detect spectral radiation induced in the reaction products.
Figure 6:
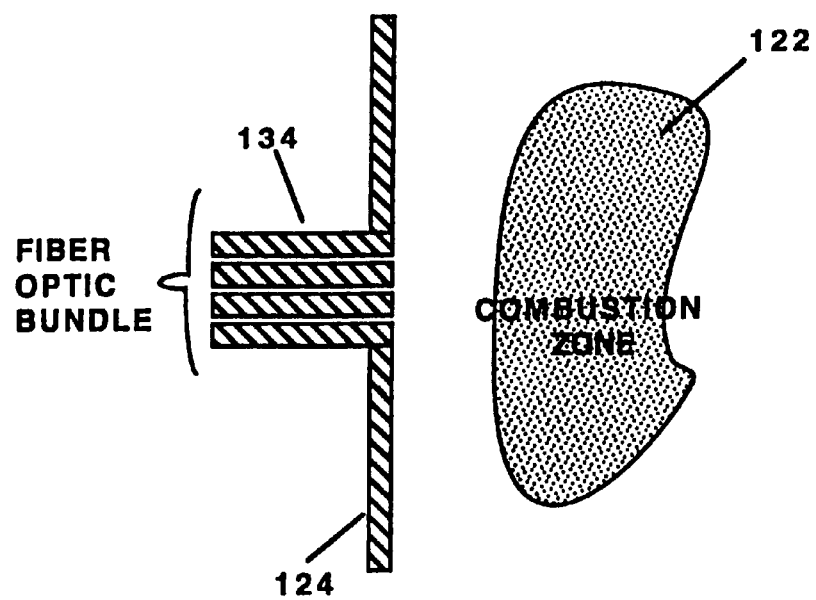
FIG. 6 is a side view depicting part of an internal combustion engine showing light pipes such as optical fibers or fiber bundles coupled to the chamber through the wall thereof for enabling scanning of the combustion images and reaction.

FIGS. 3 through 6 are added to again emphasize the great flexibility of the present invention with respect to the specific types of scanning or imaging devices that can be used. In FIG. 3, another embodiment is shown in which a video camera 26 and infrared camera 30 are substituted for the two lasers 34 and their associated detectors 36 shown in FIG. 2. In FIG. 4, a second video camera 28 is added in another location. In FIG. 5, one or more video cameras (labeled generally 26) are used in combination with one or more lasers and their associated photodetectors (labeled generally 34, 36, respectively). FIG. 6 illustrates yet another possible arrangement for capturing video images within the combustion zone 122 using fiber-optic bundle 134 appropriately mounted in the wall of chamber 124 In each of these embodiments, along with other combinations not specifically shown, video or image data is generated and input to the computer 130 as shown in FIG. 2 (or computers 12, 44, 48 and 52 shown in FIG. 1).

Figure 7:
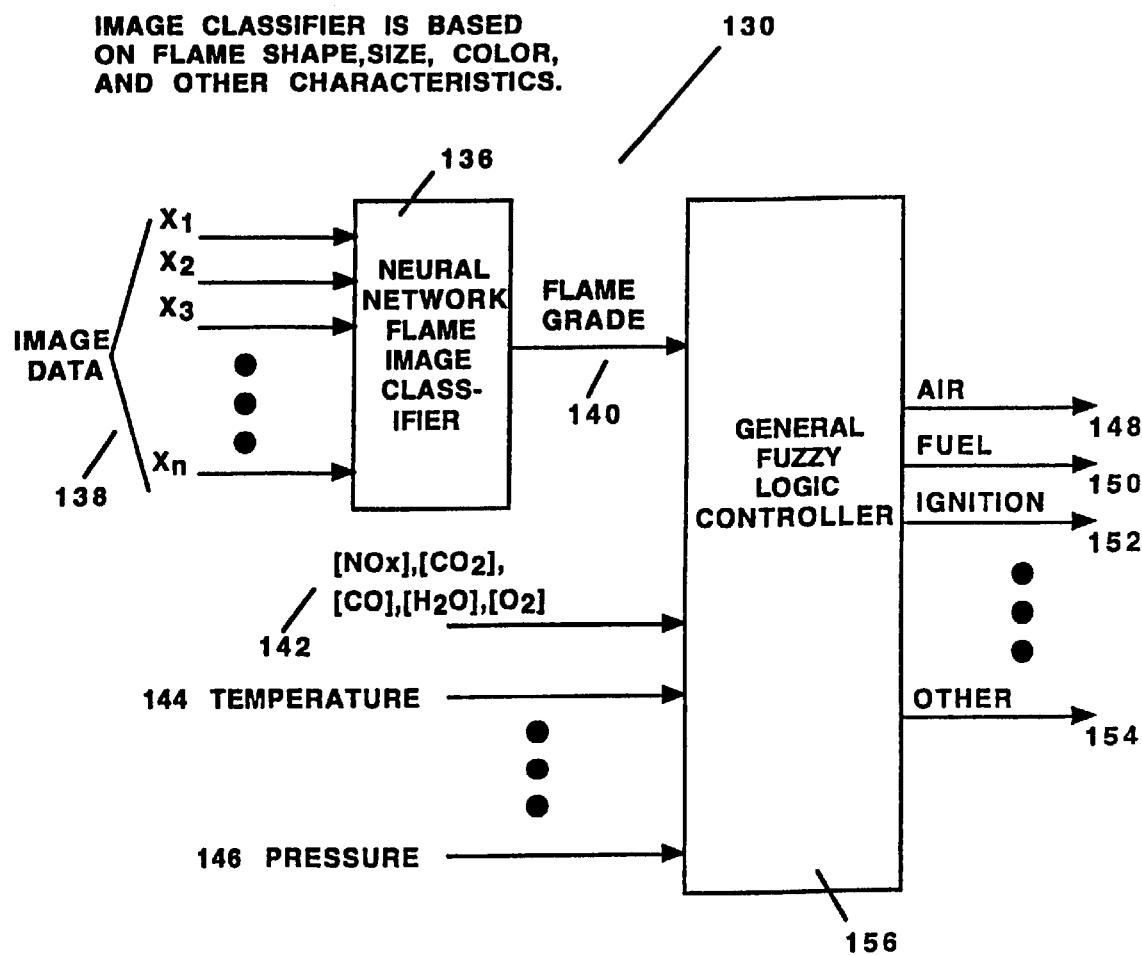
FIG. 7 is an illustration of one form of a neural network flame image classifier connected to a fuzzy logic controller to analyze input data and produce combustion control signals.

Shown in FIG. 7 is a configuration of the preferred form of the controller 130 of FIG. 2 (and of the controllers 44 and 52 of FIG. 1). The controller 130 includes a neural network flame image classifier 136 and a general fuzzy logic controller 156. Referring again to FIG. 1, the neural network flame image classifier 136 corresponds to the image analysis computer 44. The neural network flame image classifier 136 processes input image data 138 from one or more of the plurality of video or image scanners 26 etc. The neural network flame image classifier 136 is trained using appropriate neural network training algorithms to result in a flame grade classification 140 as illustrated in FIG. 7. The neural network image classifier 136 preferably processes the image input data 138 in a parallel manner for real time monitoring of the flame grade 140. As will be discussed in greater detail below in connection with FIG. 12B, the neural network is trained to establish a linear relationship between A/F ratio and the flame image. Reference is made to U.S. Pat. No. 5,249,954, incorporated herein by reference, for a more detailed discussion of determining flame grade classification using a neural network.

The flame grade itself is classified in membership functions according to fuzzy logic control algorithms as discussed further below. As shown in FIG. 7, in addition to the flame grade input from neural network flame image classifier 136, the general fuzzy logic controller 156 also receives and analyzes other sensor data, such as temperature input 144 and pressure input 146. In addition, the fuzzy logic controller 156 receives input data 142 generated from the spectral analysis computer 48, indicating, for example, the concentration of different selected elements and pollutants such as $NO_x$, $CO_2$, CO, $H_2O$, or $O_2$. As will be discussed in greater detail below, the fuzzy logic controller 156 uses fuzzy logic inference rules, including possible adaptive control measures, to generate control outputs 148, 150, 152 and 154 for the combustion process.

Figure 8:
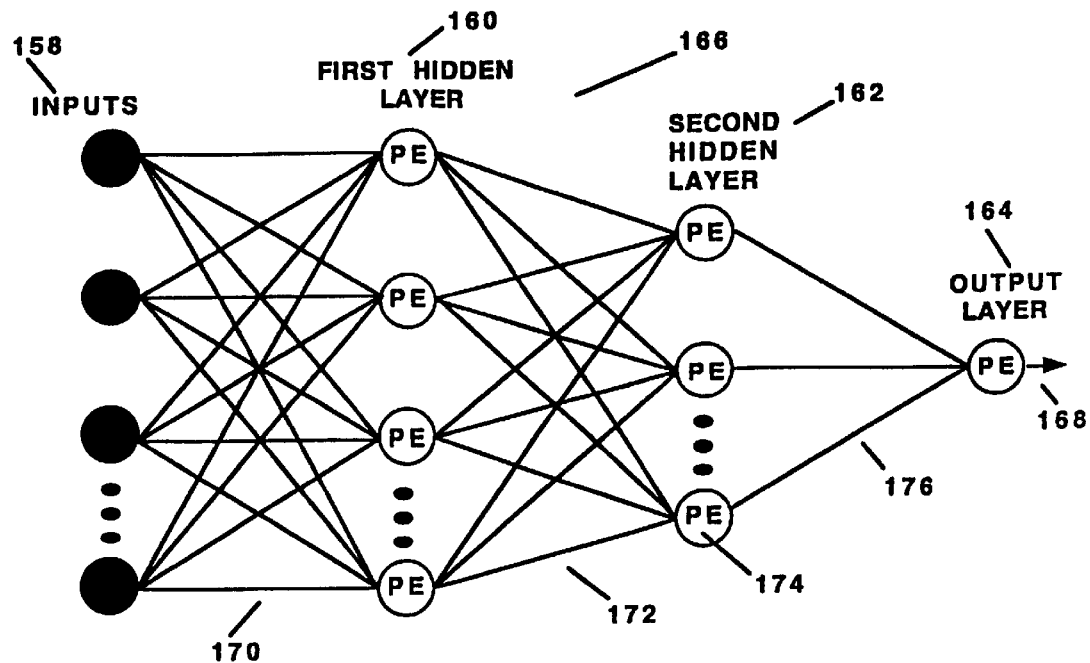
FIG. 8 is a diagram illustrating one form of a neural network useful in the invention.

FIG. 8 illustrates a recommended configuration of the neural network 136 shown in FIG. 7 that is used to classify the flame grade based on the image input data 158. The image data inputs 158 are processed by parallel processing elements (PE) in a first hidden layer 160 and a second hidden layer 162. The first hidden layer 160 and the second hidden layer 162 together form a structure, given the appropriate weights, to approximate air/fuel ratio. Each of the processing elements 174 of the first hidden layer 160 are coupled to the multiple data inputs 158, as indicated by the data paths 170. Similarly, the processing elements 174 of the second hidden layer are coupled to each of the processing elements 174 of the first hidden layer 160 as indicated by the data paths 172. The processing elements 174 of the second hidden layer 162 are coupled to processing element 174 of the final output layer 164, as represented by the data paths 176. The final output generated by output layer 164 is indicative of the grade of the flame within the combustion chamber 124. For more detailed explanations on the general configuration and operation of neural networks, see the following references, each of which is incorporated herein by reference: Lippman, Richard P., "An Introduction to Computing with Neural Net," *IEEE ASSP Magazine*. April 1987, at pp. 4–22; "Special Issue on Neural Networks II: Analysis, Techniques & Applications," *Proceedings of the IEEE,* Vol. 78, No. 10, October 1995; Shiraishi, Hitoshi, "CMAC Neural Network Controller for Fuel-Injection Systems," *IEEE Transactions on Control Systems Technology,* Vol. 3, No. 1, March 1995, at pp. 32–37; and Widrow, Lehr, "30 Years of Adaptive Neural Networks: Perceptron, Madaline and Backpropagation," *Proceedings of the IEEE* Vol. 78, No. 9, September 1990, at pp. 1415–1442.

Figure 9:
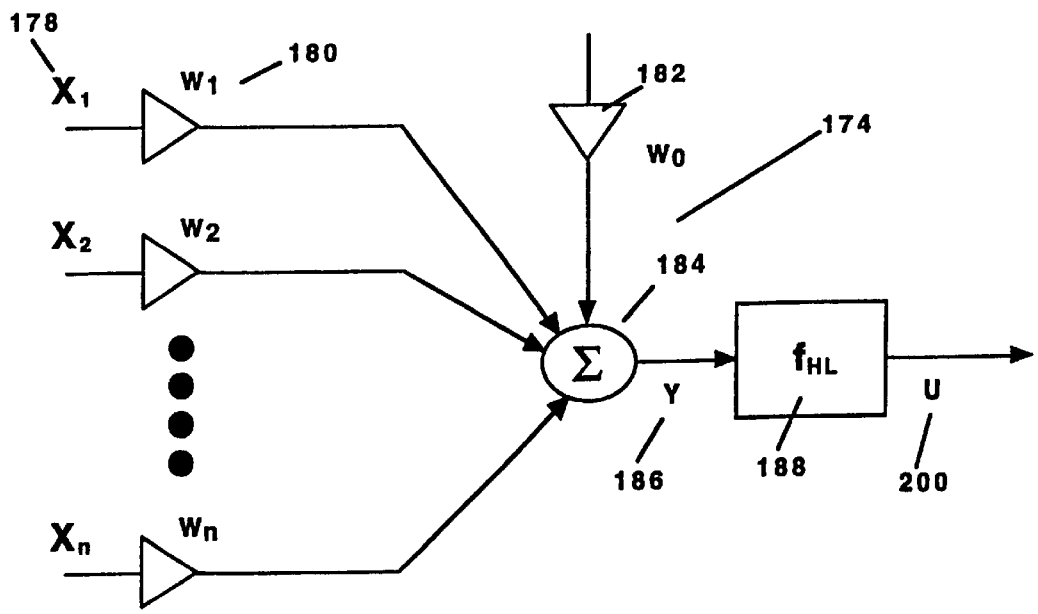
FIG. 9 is an illustration of a neural network processing element for use in the network of FIG. 8.

FIG. 9 illustrates in more detail a typical processing element PE of FIG. 8. The variables $X_1, X_2 \ldots X_n$, represent electrical inputs 170, 172 or 176 to the individual processing elements PE. The individual inputs are weighted using circuits $W_1, W_2 \ldots W_n$, and are then summed in element 184 which may also accept an offset input from amplifier 182 as illustrated. The output of the summing element is passed through the nonlinear sigmoid function 188 to generate the output 200. For more detailed explanations on the configuration and operation of processing elements in neural networks, see the references identified immediately above.

The neural network of FIG. 7 with processing elements as shown in FIG. 8 is trained to recognize different flame grades. This is accomplished by presenting different flame images of predetermined grade to the camera input and adjusting the weighting elements of FIG. 8 to result in the desired flame grade output from the network of FIG. 7. Training can be accomplished using, for example, the "back propagation learning rule" described in the Lippman and Widrow articles identified immediately above. In general, an error signal can be defined as equal to the sum of the squared errors of the desired network outputs and the actual outputs. A gradient vector is then obtained by calculating backwards through the network, and the processing element weights of FIG. 8 are optimized to minimize the sum of the squared errors over the input image set.

Figure 10:
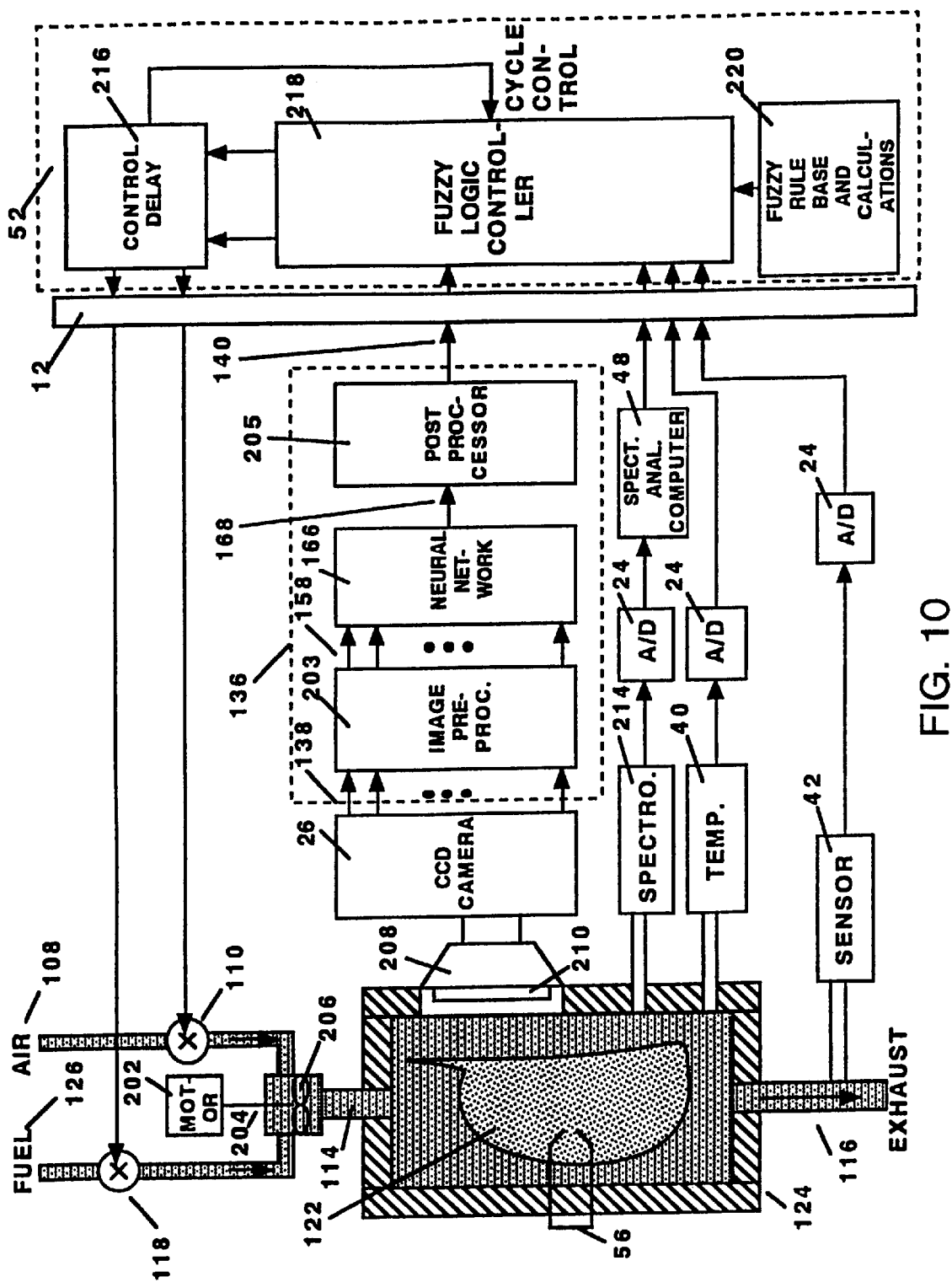
FIG. 10 is a more detailed block diagram illustrating portions of a controller for analyzing and controlling a combustion process taking place in a reactor.

FIG. 10 illustrates in more detail a block diagram embodiment of the computer analysis portions of FIG. 1. In the embodiment of FIG. 10, a neural network flame image classifier 136 provides flame grade signals 140 to a decision analysis computer 52 through microprocessor/computer and signal switching circuit 12. A fuzzy logic controller 218 receives the output of the flame image classifier 136, and other sensors, such as the illustrated temperature sensors 40 and pressure sensors 42. The fuzzy logic controller 218 also receives inputs from spectral analyzing computer 48, which generates signals indicating the concentration of various elements of interest in the combustion process such as $NO_x$, $CO_2$, CO, $H_2O$ or $NO_2$. Routing of data to the fuzzy logic controller 218 is controlled by computer or signal switching circuit 12.

As shown in FIG. 10, combustion takes place in a combustion chamber 124, with air 108 and fuel 126 being supplied through control valves 110 and 118, respectively, as illustrated. The combustion is ignited by ignition element 56, producing the flame in the combustion zone 122. The air 108 and fuel 126 are mixed in turbulence generator 206 under control of motor 202 coupled thereto via shaft 204. The resulting mixture flows to combustion chamber 124 via inlet 114. Exhaust 116 is evacuated from the chamber 124. Fuel inlet and outlet valves leading into and out of the combustion chamber (not shown in FIG. 10) may also be used as shown in FIG. 2.

The combustion process is monitored using any appropriate form of imaging device. Illustrated in FIG. 10 is a CCD camera 26 that scans or images through an appropriate lens and filtering mechanism 208, and preferably incorporating a changeable filter 210. The output signals from the CCD camera 26 are passed to the image processing section 136, which includes an image pre-processor 203, a neural network 168, and a post processor 205. The image pre-processor 203 processes the image data to compensate for flame location and size distribution in the combustion chamber 124. The output signals 158 from the image preprocessor 203 are passed to neural network 166, which is preferably of the type illustrated and discussed in connection with FIGS. 8 and 9. The neural network 166 provides classification of the image signals according to predetermined flame grades (for example, grades 1 through 10). The post processor 205 samples the neural network output 166 and produces appropriate control signals 140. The control signals 140 are in turn input to the computer 12, and then passed to the decision analysis computer 52, as illustrated.

In addition, spectroscopy measurements using sensor 214, temperature measurements using sensor 40, and other measurements, for example, of the composition of exhaust gases using sensor 42, are also made. The output of the laser spectroscopy detector 214 is passed to A/D convertor 24 and spectroscopy analysis computer 48. Output from spectroscopy analysis computer 48 and A/D converters 24 are routed to computer 12, which in turn passes the data to decision computer 52. The decision analysis computer 52 uses fuzzy reasoning, as discussed in more detail below, to generate system control signals to optimize the combustion process, by adjusting control of rate of flow of air 108 and/or fuel 126, along with other combustion parameters.

In its preferred form, and as shown in FIG. 10, the decision analysis computer 52 includes a fuzzy logic controller 218. The fuzzy logic controller 218 includes a fuzzy rule base 220, and an associated control delay block 216. The delay block 216 is used to allow enough time for the system to settle before changing the air and/or fuel flow rates. As described in greater detail below, the rule base 220 includes the fuzzy inference rules used to control the combustion process based on expert system knowledge of appropriate control actions depending upon the various sensor variable inputs.

More specifically, the controller 218 includes the necessary software and/or hardware to determine the correct change in fuel and/or air flow rates, referred to below as (A/F), and to reset the rates at set point values depending upon control actions as explained further in FIGS. 11, 12, 13, and 14 below. The fuzzy signal $\Delta(A/F)$, representing the desired change in the air to fuel ratio as computed by the decision analysis computer 52, is defuzzified to a crisp value (a discrete value, i.e. 2.31, 7.82, 9.52, ...) and converted to control signals $\Delta A$ and/or $\Delta F$. The control signals $\Delta A$ and $\Delta F$ are in turn passed to computer 12. As represented in FIG. 10, computer 12 generates appropriate control signals to set the proper flow of air and/or fuel to the combustion chamber 124, for example, by controlling valves 110 and 118.

The reactants in a combustion process comprise a stoichiometric mixture if the mixture has exact relative proportions of the substances involved in the reaction for complete combustion. For example, a combustion process involving methane and oxygen would proceed according to the following equation:

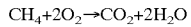

$$CH_4 + 2O_2 \rightarrow CO_2 + 2H_2O$$

This equation shows that for a stoichiometric mixture, one volume of methane requires two volumes of oxygen to produce complete combustion. The results are carbon dioxide and water. Air is approximately a mixture of oxygen and nitrogen, being about 21% oxygen and 79% nitrogen by volume. The relationship for stoichiometric combustion for air and methane follows as:

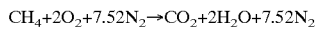

$$CH_4 + 2O_2 + 7.52N_2 \rightarrow CO_2 + 2H_2O + 7.52N_2$$

It follows, therefore, that stoichiometric combustion for air and methane requires 9.52 (i.e., 2+7.52) volumes of air for each corresponding volume of methane. Thus, the A/F ratio for stoichiometric combustion using methane is 9.52.

Similarly, stoichiometric combustion for air and automotive fuel typically requires between 14 and 15 volumes of air to one volume of fuel. In practice it is impossible to obtain complete combustion of automotive fuel under stoichiometric conditions, and as a result, excess air is normally provided. The result is operation with an A/F value above the stoichiometric requirement. However, the flame temperature will be highest if combustion takes place with a stoichiometric mixture. Specifically, excess air in the combustion process causes an increase in the mass of air gases relative to the mass of fuel, resulting in a reduction in the combustion temperature. As a result, it is important that not too much air be supplied to the combustion process.

The combustion process also results in the formation of the oxides of nitrogen ($NO_x$) in the form of unwanted atmospheric pollution. Thus, it is preferred to optimize the combustion process to minimize generation of the oxides of nitrogen, including specifically $N_2O$ (nitrous oxide), NO (nitric oxide) and $NO_2$ (nitrogen dioxide). The oxides of nitrogen tend to be higher at stoichiometric conditions, and decrease as the A/F ratio increases in the "lean" burn region. Pollutants of this and other types can also be reduced by use of catalytic conversion, and plasma generators, ultrasonic generators, or electrostatic precipitators.

Figure 11:
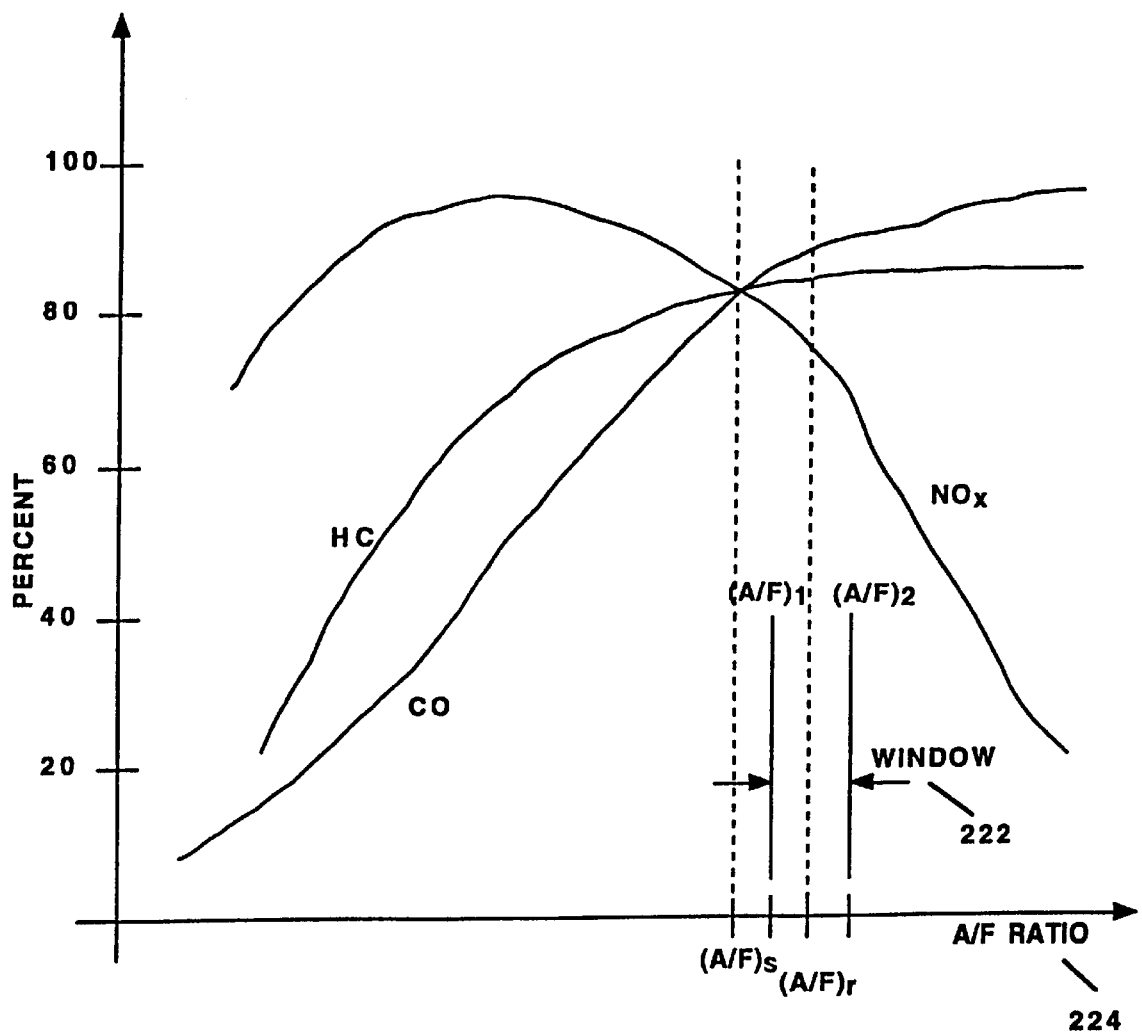
FIG. 11 is a graph illustrating typical variations in pollutants with increasing air to fuel (A/F) ratio.

Some typical important relationships of several pollutants to the A/F ratio are illustrated in FIG. 11. As shown, increasing the A/F ratio will generally decrease the percentages of oxides of nitrogen, but may in turn increase carbon monoxide and other pollutant percentages. Thus, while it may be desirable to increase the excess air to decrease the oxides of nitrogen, attention must also be paid to the other pollutants and to the resulting decrease in efficiency of the overall combustion process.

The general control problem of optimizing the combustion process requires controlling the A/F ratio in a desired range above the stoichiometric value to result in a "lean" burn, maintaining the overall efficiency of the combustion process, while at the same time minimizing the unnecessary generation of pollutants. The factors involved in optimizing the combustion process are varied, and their relationships are nonlinear and interdependent. Those complexities require carefully structured control algorithms. Moreover, measurements made of the combustion process using various sensor mechanisms including video scanning, infrared scanning, laser scanning, temperature sensors, and chemical detection sensors can be inaccurate in performance, particularly when used individually to monitor the complexities of combustion. Those complexities and uncertainties make fuzzy logic an ideal methodology to optimize the combustion process by monitoring and analyzing the various sensor outputs according to properly weighted parameters.

The following definitions and equations are used to characterize the combustion control system and method herein disclosed:

$F_r$=reference fuel flow rate
$A_1$=minimum acceptable air flow
$A_2$=maximum acceptable air flow
$F_1$=minimum acceptable fuel flow
$F_2$=maximum acceptable fuel flow
$A_p$=present air flow
$F_p$=present fuel flow
$\alpha$=relative magnitude coefficient ($0 \leq \alpha \leq 1$)
$\Delta A$=change in air flow
$\Delta A = F_p * \Delta(A/F)_c$ with $\Delta F = 0$
$\Delta A = \alpha * F_p * \Delta(A/F)_c$ with $\Delta F$ non-zero
$\Delta F$=change in fuel flow
$\Delta F = -F_p / [1 + A_p/(F_p * \Delta(A/F)_c)]$ with $\Delta A = 0$
$\Delta F = (F_p)^2 (\alpha-1) * \Delta(A/F)_c / [A_p + F_p * \Delta(A/F)_c]$ with $\Delta A$ non-zero
$(A/F)_r$=desired A/F ratio reference (set) point
$(A/F)_1$=minimum acceptable A/F ratio
$(A/F)_2$=maximum acceptable A/F ratio
$(A/F)_s$=stoichiometric A/F ratio
$\Delta(A/F)$=change in A/F ratio fuzzy value
$\Delta(A/F)_c$=change in A/F ratio crisp value
$\Delta(A/F)_c = (A_p + \alpha A)/(F_p + \Delta F) - A_p/F_p$ In a preferred form of the invention, a particular nominal operating point for the air-to-fuel ratio $(A/F)_r$ is selected, as indicated by the numeral 222 in FIG. 11. The desired air-to-fuel ratio $(A/F)_r$ is selected within an operating window defined to set an optimum range above and below the set point $(A/F)_r$ such that $(A/F)_1 \leq (A/F)_r < (A/F)_2$. The operating window is selected to result in acceptable pollutant, temperature and flame grade ranges. For example, the set point 222 can be defined to avoid increasing unwanted CO and HC, while also reducing $NO_x$ values from their maximums.

In its preferred form, the fuzzy logic controller of the present invention is designed to maintain the air flow between a minimum acceptable value ($A_1$) and maximum acceptable value ($A_2$) and the fuel flow between a minimum acceptable value ($F_1$) and a maximum acceptable value ($F_2$). The controller is programmed to maintain pollutants, temperature and flame grade within acceptable limits while maintaining operation in the defined window about the target reference point ratio $(A/F)_r$. The controller is also programmed to insure a "lean" burn operation above the stoichiometric air to fuel ratio $(A/F)_S$.

Figure 12A:
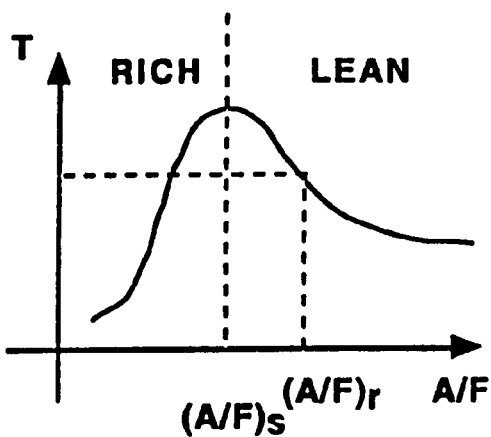
FIGS. 12A through 12D are graphs illustrating the variation of temperature, flame grade, and typical pollutant concentration as a function of the air to fuel (A/F) ratio.
Figure 12B:
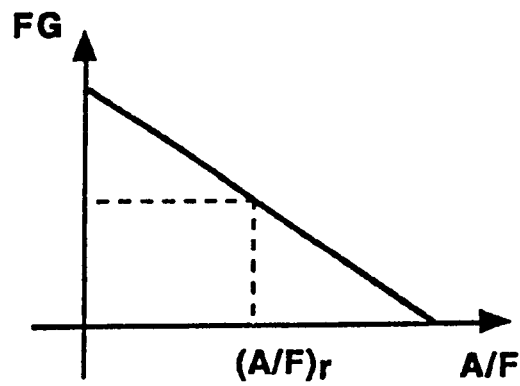

It is desirable to select a particular A/F ratio in the "lean" burn region of the combustion process that is above the stoichiometric A/F ratio, yet not so high as to significantly compromise the efficiency of the combustion process. Having selected such a A/F ratio, the control system monitors the outputs of multiple sensors and proceeds to optimize the A/F ratio to result in combustion within the defined window about the selected reference point. FIGS. 12A through 12D illustrate operation at such a set point $(A/F)_r$. Specifically, in each of FIGS. 12A through 12D, the air-to-fuel ratio (A/F) is depicted on the horizontal axis. In FIG. 12A, temperature T is depicted on the vertical axis. As shown in FIG. 12A, the maximum temperature will be at the stoichiometric value designated $(A/F)_S$. The reference point $(A/F)_r$ is chosen in the "lean" burn region above the stoichiometric $(A/F)_s$ value. In FIG. 12B, the flame grade FG is shown on the vertical axis. The value for the flame grade is determined from the neural network processor of FIG. 10, as described earlier, and is chosen as a linear decreasing function of the A/F ratio. The optimal flame grade for the selected $(A/F)_r$ reference point is determined from this relationship. As shown in FIG. 12B, lower flame grades correspond to higher A/F ratios, and higher flame grades correspond to lower A/F ratios.

Figure 12C:
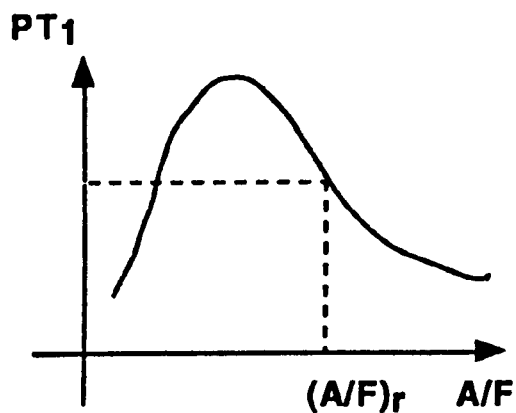
Figure 12D:
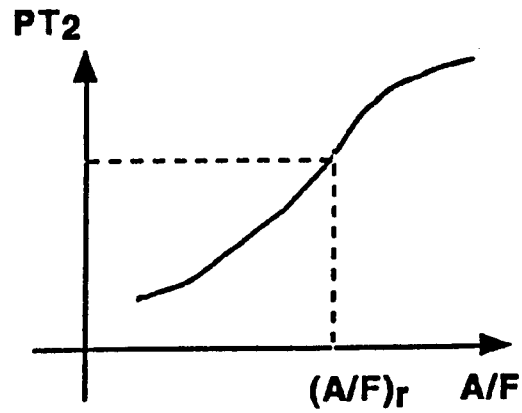

FIGS. 12C and 12D illustrate two different pollutants PT1 and PT2 and their variability as a function of the A/F ratio. In FIG. 12C, PT1 decreases with increasing A/F above some value, whereas in FIG. 12D, PT2 increases with increasing A/F ratio. The values of the pollutants PT1 and PT2 at the chosen reference point for operation $(A/F)_r$ will be as illustrated in FIGS. 12C and 12D. Pollutant values above or below the reference point will typically indicate that the A/F ratio is not at the desired reference point selected for operational efficiency and control of unwanted emissions.

The fuzzy logic controller 218 of FIG. 10 executes fuzzy logic inference rules from fuzzy rule base 220. Input and output variables are defined as members of fuzzy sets with degrees of membership in the respective fuzzy sets determined by specified membership functions. The rule base defines the fuzzy inference system and is based on expert knowledge for system control based on observed values of the control variables. The input data defines the membership functions used in the fuzzy rules. The reasoning mechanism executes the fuzzy inference rules, converting the input data to output control values using the data base membership functions.

In general, expert systems using fuzzy logic inference rules are well known, as described in the following publications, each of which is incorporated herein by reference: Gottwald, Siegried, *Fuzzy Sets and Fuzzy Logic: The Foundations of Application—from a Mathematical Point Of View*, Vieweg & Sohn, Braunschweig Wiesbaden (1993), ISBN 3-528-05311-9; McNeill, Daniel, *Fuzzy Logic*, Simon & Schuster, New York (1993), ISBN 0-671-73843-7; Marks, Robert J. II, *Fuzzy Logic Technology and Applications*, IEEE Technology Update Series (1994), ISBN 0-7803-1383-6, IEEE Catalog No. 94CR0101-6; Bosacchi, Bruno and Bezdek, James C, *Applications of Fuzzy Logic Technology*, Sep. 8–10, 1993, Boston, Mass., sponsored and published by the SPIE—The International Society for Optical Engineering, SPIE No. 2061, ISBN 0-81941326-7; Mendel, Jerry M., "Fuzzy Logic Systems for Engineering: A Tutorial", Proceedings of the IEEE, Vol. 83, No. 3, March 1995, pgs. 345–377; Jang, Jyh-Shing Roger, Sun, Chuen-Tsai, "Neuro-Fuzzy Modelling and Control", Proceedings of the IEEE, Vol. 83, No. 3, March 1995, pgs. 378–406; Schwartz, Klir, "Fuzzy Logic Flowers in Japan", IEEE Spectrum, July 1992, pgs. 32–35; Kosko, Isaka, "Fuzzy Logic", Scientific American, July 1993, pgs. 76–81; Cox, "Fuzzy Fundamentals", IEEE Spectrum, October 1992, pgs. 58–61; Brubaker, "Fuzzy Operators", EDN, Nov. 9, 1995, pgs. 239–241.

A preferred embodiment of the fuzzy logic controller disclosed herein is based on a fuzzy reasoning system using input variables corresponding to at least temperature, flame grade, and pollutant concentration, and generates output signals that indicate a correction in the A/F ratio. By adjusting the air and/or fuel flows, the fuzzy logic controller attempts to maintain operation within a window or range about the desired reference point $(A/F)_r$. The preferred embodiment of the fuzzy logic controller is implemented using triangular fuzzy membership functions as shown in FIGS. 13A through 13D. Other membership functions (MFs) are possible including: (1) Trapezoidal MFs, (2) Gaussian MFs, (3) Generalized Bell MFs, and (4) Sigmoidal MFs, and can easily be substituted for the triangular fuzzy membership functions.

The rule base for the combustion control system and method disclosed herein is formulated with "IF . . . THEN . . . " structures representing the linguistic expression of the logical elements involved in the fuzzy logic rule base. As shown in FIG. 13, the triangular membership functions include overlapping membership ranges for the following variable ranges:

FLAME GRADE: 1,2,3,4 OR 5
TEMPERATURE: VERY COOL (VC), COOL (C), WARM (W), HOT (H), and VERY HOT (VH)
POLLUTANTS: FAR BELOW REFERENCE (FBR), BELOW REFERENCE (BR), REFERENCE (R), ABOVE REFERENCE (AR), FAR ABOVE REFERENCE (FAR)
A/F RATIO INCREMENT: $-2\Delta, -\Delta, 0, +\Delta, +2\Delta$ To better understand the fuzzy logic compositional rules applied to the combustion fuzzy reasoning system and method herein disclosed, consider first just the temperature variable shown in FIG. 13B. The fuzzy set corresponding to "Very Cool" temperatures {TVC} is the set of all temperatures T between zero and the upper temperature $TVC_u$ defined for very cool temperatures. Similarly, the fuzzy set corresponding to cool temperatures {TC} is the set of all temperatures between the lowest defined cool temperature $TC_1$ and the upper cool temperature $TC_u$. Because of the "fuzzy" definitions of "very cool" and "cool," it will be true that $TC_1 < TVC_u$, and the fuzzy sets will overlap. Similarly, for example, overlap occurs between the defined cool and warm temperature ranges.

Figure 13A:
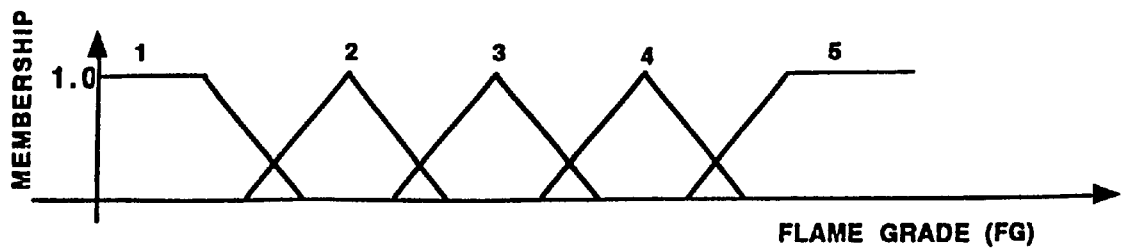
FIGS. 13A through 13D illustrate fuzzy logic membership functions for input and output variables useful in the combustion controller.
Figure 13B:
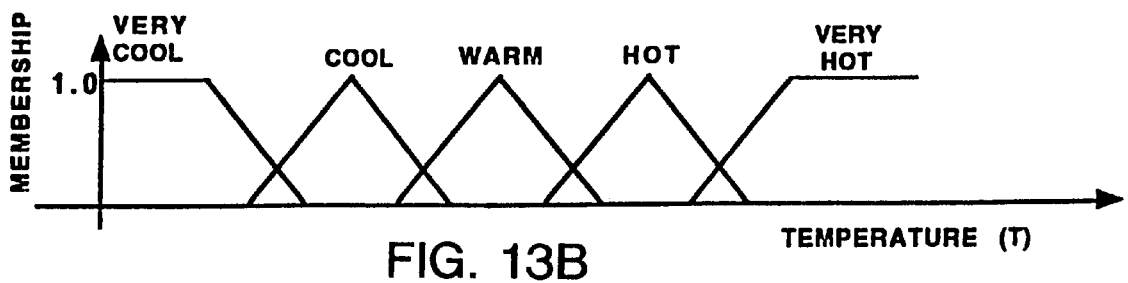
Figure 13C:
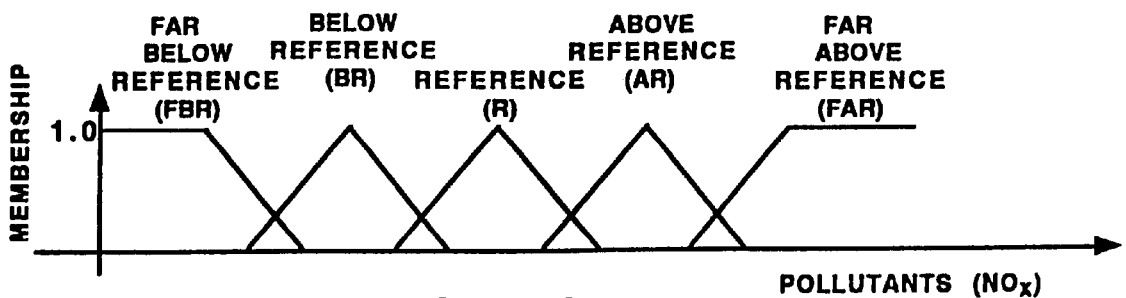
Figure 13D:
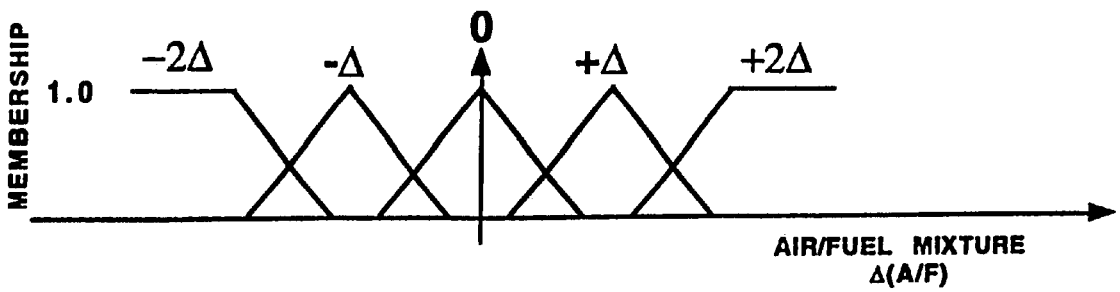

The nature of the overlapping membership functions for several of the variables involved in the disclosed combustion controller is illustrated in FIG. 13A through 13C. Similar relationships would exist for other variables not shown. For any combination of the input variables defining the flame grade, temperature and pollutants, the corresponding $\Delta(A/F)$ subset membership is determined from the fuzzy rule base, as shown in FIG. 13D. The $\Delta$'s of the $\Delta(A/F)$ subset membership are made small relative to $(A/F)_r$ so that the A/F setting can be made more precise.

Figure 14:
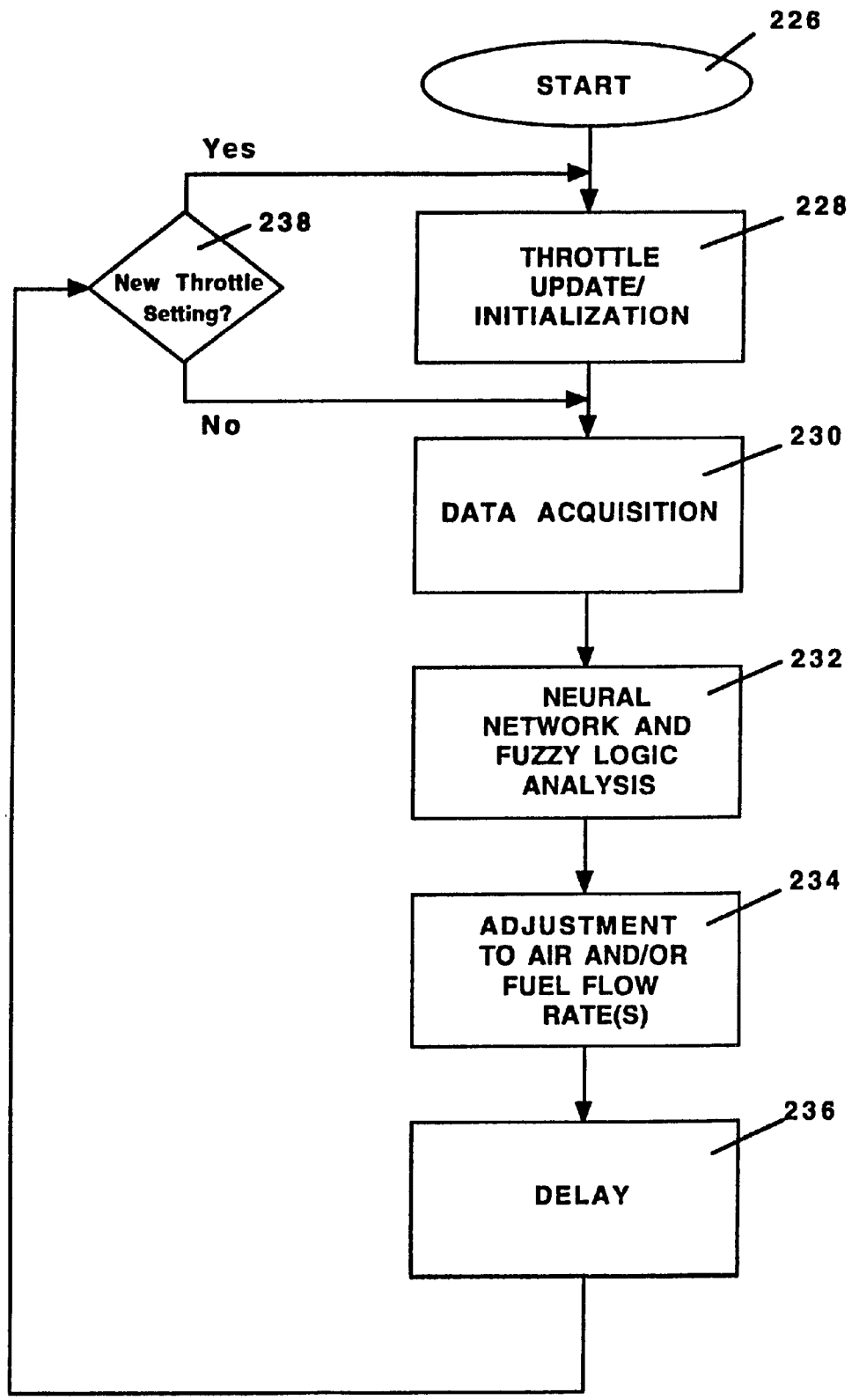
FIG. 14 is a general flow chart for control of the combustion process.

Shown in FIG. 14 is a flow chart illustrating a method of optimizing the combustion process using the system described above. At start 226 the update/initialization process occurs by updating fuel and air flows ($F_p$ and $A_p$, respectively) to a new value if there has been a change in throttle position (i.e. fuel input) as tested in condition 238. If no update is needed, control is passed to the data acquisition block 230. Otherwise, the air rate $(A)_p$ and fuel rate $(F)_p$ are updated to reflect new throttle position. From data acquisition block 230, a fuzzy logic analysis 232 is performed to compute the change in A/F ratio at block 234. After these operations, a controller delay 236 is added to allow the system to stabilize to a steady state equilibrium point at the new fuel and air flow rates before making new measurements and performing further control action.

The combustion control operations shown generally in FIG. 14 are discussed in greater detail in connection with FIGS. 15A and 15B. The combustion control process is initialized by setting the original values for air and fuel flow at a ratio $(A/F)_r$ that is expected to yield optimum performance with minimal emissions. Data is then acquired from the various sensors, and if necessary, pre-processed by the various associated computers (such as the image analysis computer 44 and spectral analysis computer 48, shown in FIG. 1). Using the proposed fuzzy rule base and associated calculations, the fuzzy logic controller analyzes the various data inputs and renders a decision for a recommended adjustment to the air-fuel-ratio $\Delta(A/F)$. Based on the recommended adjustment $\Delta(A/F)$, appropriate new settings for flow of air $A_p$ and/or fuel $F_p$ are calculated. Signals are generated to control the valves to adjust the flow of air $A_p$ and/or fuel $F_p$ into the combustion chamber. After a short delay, the input data is again evaluated to test for new air and fuel set values.

Figure 15A:
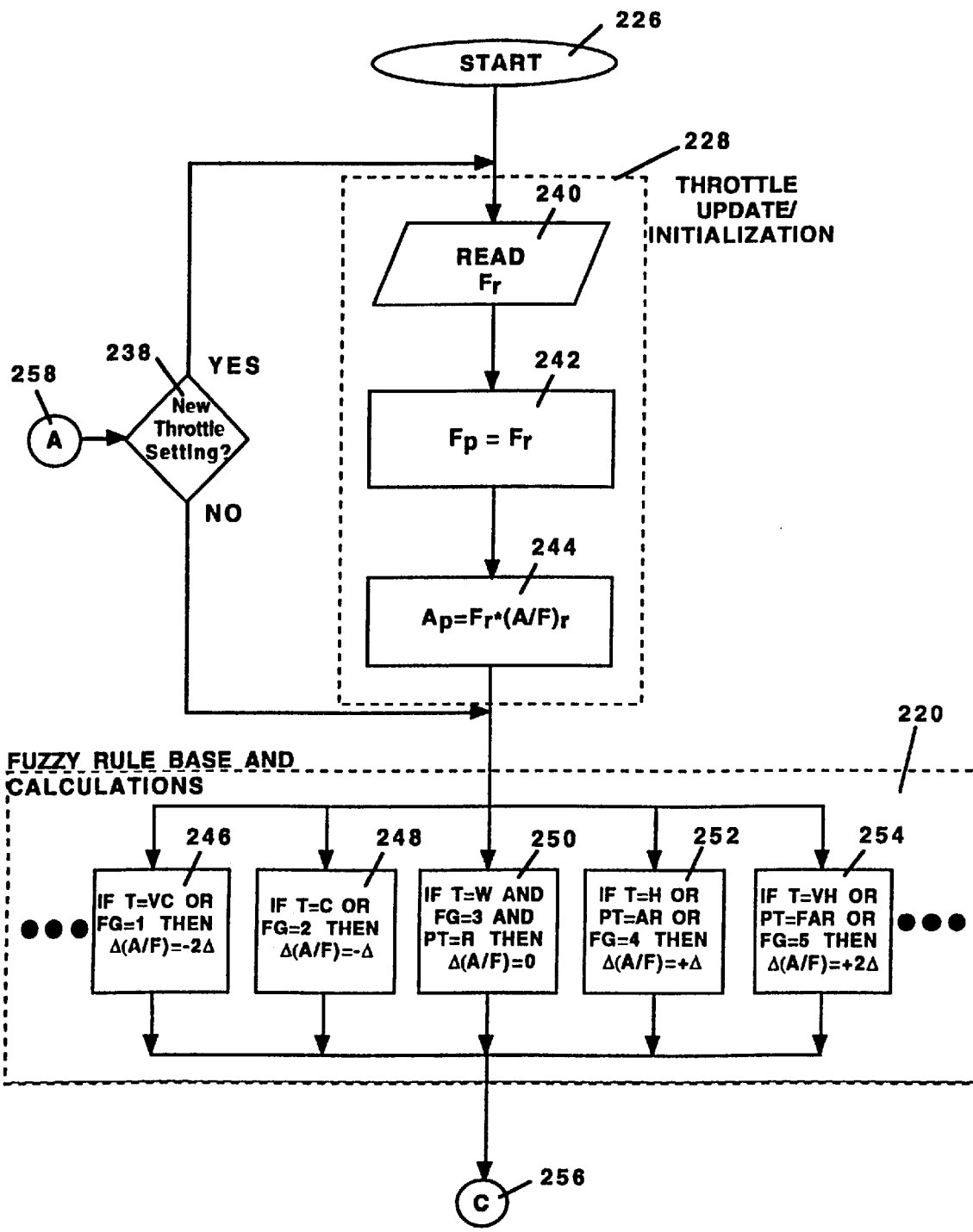
FIGS. 15A and 15B are flow charts illustrating a method of analyzing and optimizing the combustion process using fuzzy logic rules.

In FIG. 15A, the algorithm begins at the start 226, followed by an throttle update initialization process indicated by the group 228. The initialization process includes reading the new reference fuel flow value ($F_r$, from the throttle position) as indicated at block 240. As indicated in block 242, the present fuel flow value ($F_p$) is set equal to the reference fuel flow value ($F_r$). This allows the system to change the flow rates to satisfy varying engine load requirements. Likewise, the air value (A) is set at a new set point $A_p$ corresponding to the desired "lean" burn air-to-fuel ratio of $(A/F)_r$ for optimum performance, as shown at block 244.

As indicated in FIG. 11, the fuzzy logic controller 218 (of FIG. 10) is designed to operate in a window or region 222 centered around $(A/F)_r$, with $(A/F)_1$ being the lower bound on the A/F ratio and $(A/F)_2$ being the upper bound on the A/F ratio. After analyzing the numerous inputs in accordance with the fuzzy rule base 220 of FIG. 15A, the fuzzy logic controller 218 will render a decision as to a proper adjustment to the air-fuel ratio $\Delta(A/F)$, and appropriate new settings for $A_p$ and $F_p$ are calculated. As shown in FIG. 15B in the cycle control section 290, after the air (Ap) and fuel (Fp) flow rates have been set, a delay 292 is added before testing for a new fuel reference value. The loop repeats with update/initialization 228, of FIG. 15A, if the throttle setting has changed. Otherwise, the loop repeats without initialization 228.

The fuzzy rule base and calculation operations of the controller are illustrated in FIG. 15A at 220. Those operations accept as inputs the measured values of temperature (T), flame grade (FG), and pollutant level (PT), and generate output values for changing the A/F value to maintain operation in the defined window about the reference point, $(A/F)_r$. The fuzzy logic inference rules for those operations are indicated in FIG. 15A as follows:

Rule 246: If (T=VC) or (FG=1), then $\Delta(A/F)=-2\Delta$
Rule 248: If (T=C) or (FG=2), then $\Delta(A/F)=-\Delta$
Rule 250: If (T=W) and (PT=R) and (FG=3), then $\Delta(A/F)=0$
Rule 252: If (T=H) or (PT=AR) or (FG=4), then $\Delta(A/F)=+\Delta$
Rule 254: If (T=VH) or (PT=FAR) or (FG=5), then $\Delta(A/F)=+2\Delta$ It should be understood that different rules would exist if different parameters and data were considered.

Further, let $U_{Ti}(T)$ represent the membership of a given temperature (T) in the fuzzy subset corresponding to the $i^{th}$ temperature range ($T_i$). Similarly, let $u_{FGi}(FG)$ and $u_{PTi}(PT)$ represent the memberships of the flame grade, and a pollutant variable in their respective $i^{th}$ fuzzy subsets. Rules 246, 248, 252 and 254 correspond to conditions where one of the input variables (either temperature, pollutant concentration, or flame grade) is outside of the acceptable range. The rules are structured so that ranges of individual variables requiring the same adjustment in the A/F ratio are combined in the same inference rule with logical "OR" operators. The use of the "OR" operator ensures that corrective action is taken if any of the measurements of the input variables indicates a value outside the acceptable range of each respective variable. For rules 252 and 254, the $\Delta(A/F)$ membership grade in the subset m corresponding to the membership in subsets i, j and k of the three input variables—flame grade, temperature and pollutant—is determined as the maximum of the membership grades of the input variables as follows:

$$u_{AFm}(\Delta(A/F))=\max\{u_{Ti}(T), u_{FGj}(FG), u_{PTk}(P)\}$$

For rules 246 and 248, only the temperature and flame grade variables are used.

Rule 250 corresponds to operation at nominal values for the temperature, pollutant, and flame grade variables. If all three variables are within their acceptable ranges, then little or no adjustment is made to the A/F ratio as defined by fuzzy membership "0" of FIG. 13D. Rule 250 is structured using the input values for each of the individual variables combined with logical "AND" operators. The use of the "AND" operator ensures that all of the variables are in the acceptable ranges. For rule 250, when multiple input variable combinations map into the same output $\Delta(A/F)$ subset, then membership in that subset is the minimum of the individual membership functions as follows:

$$u_{AFm}(\Delta(A/F))=\min\{u_{Ti}(T), u_{FGj}(FG), u_{PTk}(P)\}$$

Pollutant values are not included in rules 246 and 248 because for these conditions the pollutant concentration of $PT_1$ as indicated in FIG. 12A and FIG. 12C will certainly be below acceptable range for cooler temperatures and an A/F ratio in the "lean" burn region. It should be noted that measurements of different pollutants with different variations as a function of A/F ratio will result in different variables in the respective rules indicated in FIG. 15A. The output control signal from the fuzzy rule base and calculation section 220 of the flow diagram in FIG. 15A is the required incremental change in the A/F ratio: $-2\Delta$; $-\Delta$; 0; $+\Delta$ or $+2\Delta$.

Figure 15B:
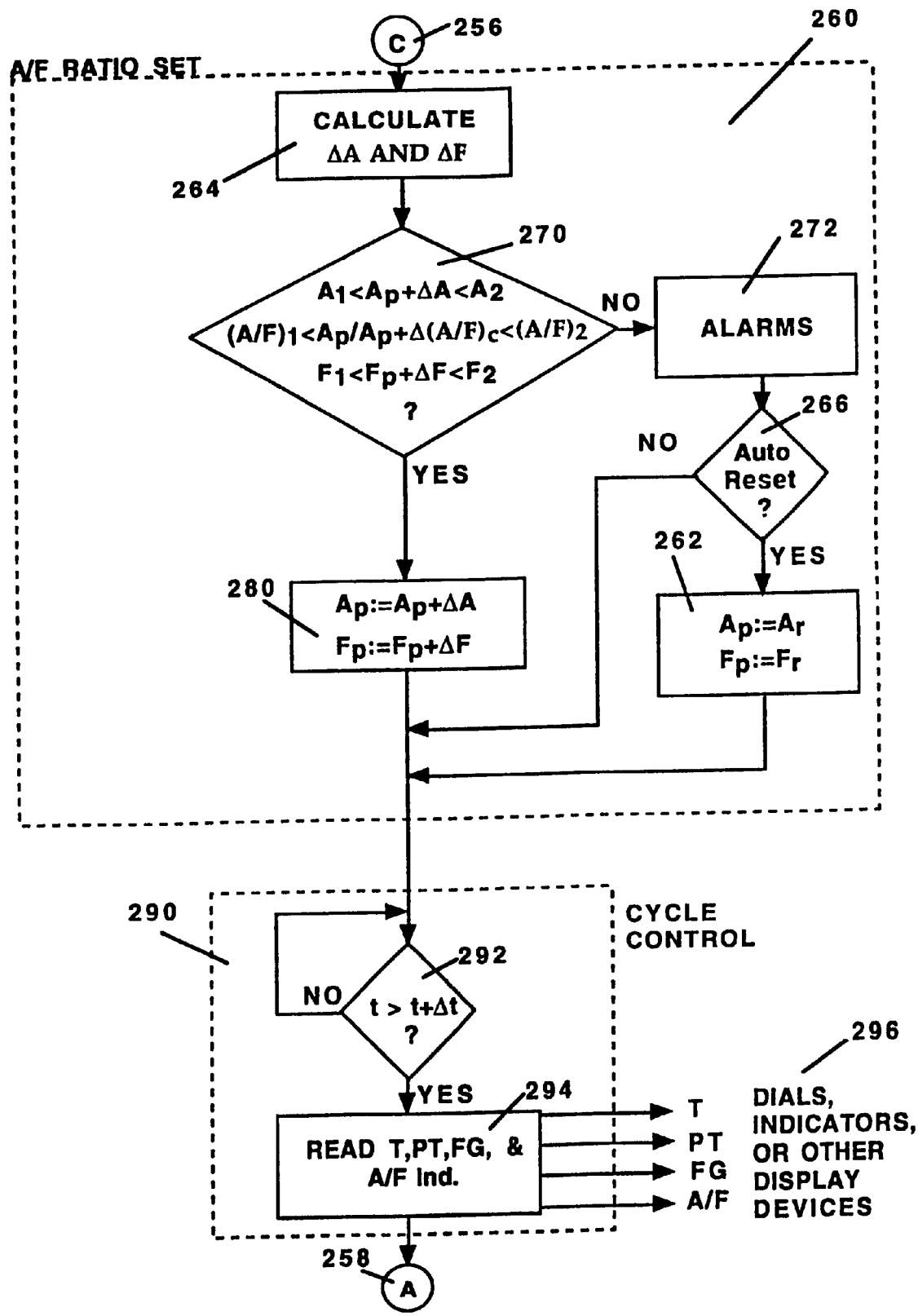

FIG. 15B of the flow chart indicates at 260 illustrates setting the A/F ratio based on the output 256 of the fuzzy rule base determined in the calculation operations 220 in FIG. 15A. In block 264 of FIG. 15B the crisp value $\Delta(A/F)_c$ is calculated by defuzzifying the output 256. The process of defuzzification will be shown in FIG. 16 below. Other well known defuzzification techniques can be used such as the composite maximum technique. From $\Delta(A/F)_c$, $A_1$, $A_2$, $F_1$, and $F_2$, the appropriate $\Delta A$ and $\Delta F$ are also calculated in block 264 of FIG. 15B.

The crisp values for $\Delta A$ and $\Delta F$ may be calculated using the above defined parameters. By definition, $$\Delta(A/F)_c = \text{(final air-to-fuel ratio)} - \text{(initial air-to-fuel ratio)} = \{(A_p + \Delta A)/(F_p + \Delta F)\} - A_p/F_p$$

If it is desired to change the air-to-fuel ratio using only changes in air flow, then $\Delta F = 0$. Solving for $\Delta A$ yields:

$$\Delta A = F_p * \Delta(A/F)_c; \; \Delta F = 0.$$

Similarly, the air-to-fuel ratio may be changed using incremental changes in fuel flow rate while holding the air flow constant. In this case, $\Delta A = 0$ and solving for $\Delta F$ yields:

$$\Delta F = -F_p/\{1 + A_p/(F_p * \Delta(A/F)_c)\}; \; \Delta A = 0.$$

It is also possible to adjust both the air flow and fuel flow rates. Instead of using the above calculated value for $\Delta A$ with $\Delta F = 0$, set $\Delta A$ as follows:

$$\Delta A = \alpha * F_p * \Delta(A/F)_c; \; 0 \leq \alpha \leq 1$$

Solving for the corresponding $\Delta F$ yields:

$$\Delta F = (1-\alpha) * [-F_p/(1 + A_p/(F_p * \Delta(A/F)_c))]$$

The coefficient $\alpha$ determines the relative contributing magnitudes of $\Delta A$ and $\Delta F$ to achieve the overall desired $\Delta(A/F)_c$ value. For example, it may be desirable to achieve the calculated $\Delta(A/F)_c$ by changing the air flow. However, if the required $\Delta(A/F)_c$ cannot be achieved by changing air flow only, then a corresponding change in $\Delta F$ may be made using the above equations to achieve the desired result. Various strategies using limit tests on the parameters involved can be implemented using the above relationships.

Test 270 of FIG. 15B determines if the new air flow, fuel flow, and air-to-fuel ratio are within acceptable limits. If the system is outside the limits, then warning alarms and/or indicators 272 are activated. After warning signals have been sent, a test 266 is used to determine if the system needs to be reset at block 262 where control is passed to the cycle control block 290. Auto reset may be a user controlled option. If no auto resetting is allowed, then control is passed directly to the cycle control block 290. If the system is operating within the established tolerances as indicated in test 270 then the new fuel and air flow rates are changed in block 280 and control is passed onto the cycle control block 290.

The cycle controller 290 provides a predetermined delay $\Delta t$ in test 292 to allow the combustion process to stabilize after changes in the air and/or fuel flows as determined in the A/F ratio test 258. Block 294 provides as an output the measured temperature, pollutant, and flame grade variables, along with the corresponding A/F ratio computed using the fuzzy logic calculation methods of FIG. 15A. Control is returned at junction 258 to test 238 of FIG. 15A to determine if the throttle setting has changed. If the throttle setting has not changed, control is passed to the fuzzy rule base calculations 220 to evaluate new input data, and the loop repeats. If the throttle setting has changed, the fuel flow and air flow rates are initialized at 228 to their new values. After setting the fuel and air flow rates, control is then passed to the fuzzy rule base calculations 220 to evaluate new input data, and the loop again repeats.

Figure 16A:
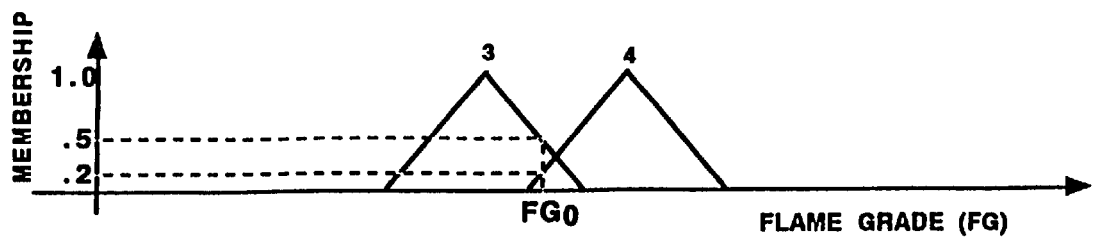
FIGS. 16A through 16E show an example graphic calculation of the output A/F ratio based on input fuzzy variable measurements.
Figure 16B:
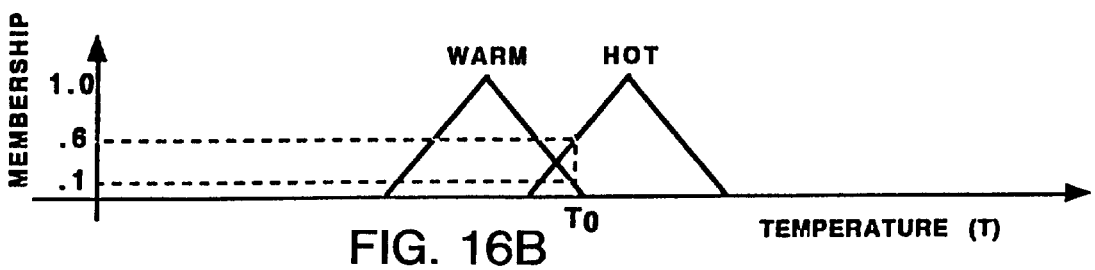
Figure 16C:
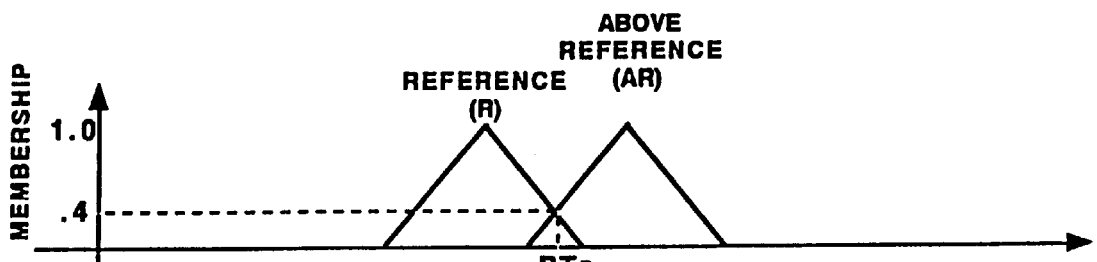
Figure 16D:
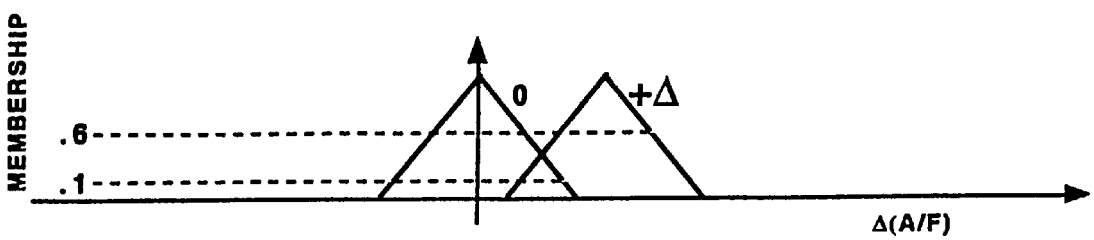

FIGS. 16A through 16E illustrate a representative calculation of a required change in the air-to-fuel ratio $\Delta(A/F)$ determined in response to measured values of the input flame grade $FG_0$, the input temperature $T_0$, and the input pollutant concentration $PT_0$. The indicated values will result in application of fuzzy inference rules 250 and 252 shown in FIG. 15A. The corresponding memberships of the individual membership functions are indicated in FIG. 16A, 16B and 16C for the input variables, and 16D for the output $\Delta(A/F)$ ratio.

As discussed above, fuzzy inference rule 250 corresponds to the nominal operating conditions constructed with logical "AND" operators. Thus, the minimums of the membership functions for flame grade, temperature and pollutants in FIGS. 16A, 16B and 16C, respectively, are selected for the membership grade $\Delta(A/F)$ in FIG. 16D. The corresponding value is 0.1 from the temperature membership function. In contrast, because rule 252 is constructed with logical "OR" operators, the membership in the $\Delta(A/F)$ variable corresponds to the maximum of the memberships of the individual variables indicated in FIGS. 16A, 16B and 16C. Thus, the appropriate value is 0.6, also derived from the temperature variable of FIG. 16B.

Figure 16E:
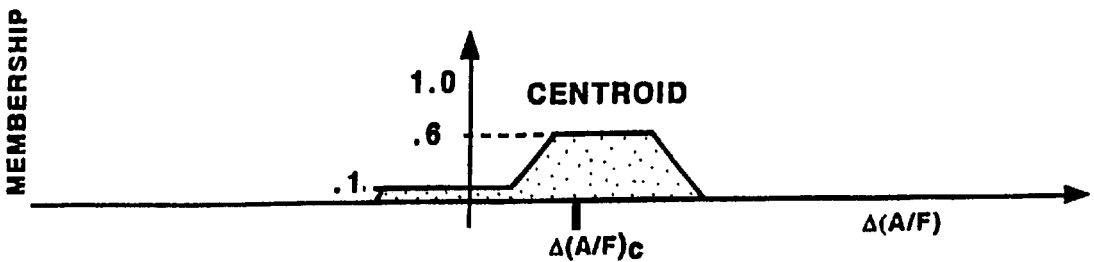

The resulting membership function for the $\Delta(A/F)$ variable is indicated in FIG. 16E. The crisp value $\Delta(A/F)_c$ is calculated using the centroid method of defuzzification as indicated. Thus, the fuzzy logic controller reflects all measured values and actions indicated by the combustion controller inference rules and produces a weighted output $\Delta(A/F)_c$ for the desired change in the air-to-fuel ratio.

As demonstrated above, the need existed for improved systems and methods that automatically optimize the combustion process to increase efficiency and minimize unwanted or harmful by-products. In view of the wide spread use of combustion systems that burn hydrocarbon fuels, even small improvements in the efficiency of the combustion process can result in significant social and environmental benefits.

The above Figures and associated text disclose improved automatic combustion control systems and methods that optimize the combustion process and improve efficiency, while at the same time reducing the emission of harmful pollutants. The systems and methods use neural networks to analyze video or image data resulting from scanning various aspects of the combustion process. Additional sensors monitor and generate input signals that define other parameters of the combustion process, such as fuel flow, air flow, air to fuel ratios, inlet turbulence and combustion turbulence. An expert computer system uses a fuzzy logic rule base to analyze the various data inputs and to determine if any adjustments are necessary to optimize the combustion process. The expert system automatically generates feedback control signals to vary the combustion parameters to maintain optimal combustion efficiency while minimizing fuel use and the generation of harmful by-products.

The inventions set forth above are subject to many modifications and changes without departing from the spirit, scope or essential characteristics thereof. Thus, the embodiments explained above should be considered in all respects as being illustrative rather than restrictive of the scope of the inventions, as defined in the appended claims. For example the scanning operations can be carried out by directing sound waves through the flames and detecting with an ultrasonic transducer variations in the reflected or other sound waves received from or passed through the combustion region. Alternatively, the receiver transducer could take the form of a diaphragm, and vibrations of the diaphragm can be detected by monitoring modulation of a laser light beam reflected from the diaphragm.

What is claimed is:

1. A method for monitoring and controlling parameters of a combustion process comprising the acts of:
   (a) directing a scanning device at the combustion process;
   (b) activating the scanning device to scan the combustion process and generate a scanning output signal that varies in accordance with variations in the combustion process;
   (c) operating additional sensors to monitor other parameters of the combustion process and to generate sensor outputs that vary in accordance with variations in the combustion process;
   (d) inputting the scanning output signal to a computer processor having at least a part thereof configured as a neural network;
   (e) operating the neural network to process the scanning output signal and to generate a combustion classification signal defining a parameter of the combustion process;
   (f) inputting the combustion classification signal and the sensor outputs to a decision analysis computer having at least a part thereof configured as a fuzzy logic controller with associated fuzzy inference rules defining combustion control actions depending on various combinations of sensor outputs and flame grade classification;
   (g) operating the decision analysis computer to: (i) analyze the combustion classification signal and sensor outputs in accordance with the fuzzy inference rules to determine appropriate combustion control actions to optimize the combustion process depending on various combinations of the sensor outputs and combustion classification signals; and (ii) generate combustion control signals defining adjustments to at least one combustion parameter; and
   (i) applying the combustion control signals to adjust at least one combustion parameter.

2. The method of claim 1 wherein the scanning device is a video camera.

3. The method of claim 2 wherein the video camera is CCD camera.

4. The method of claim 1 wherein the scanning device is a beam scanner.

5. The method of claim 1 wherein the scanning device is laser scanner and an associated detector.

6. The method of claim 1 further comprising:
   (a) directing at least one additional scanning device at the combustion process;
   (b) activating the additional scanning device to scan the combustion process and generate an additional scanning output signal that varies in accordance with variations in the combustion process;
   (c) inputting the additional scanning output signal to a scanning computer processor configured to analyze scanning data; and
   (d) operating the scanning computer processor to analyze the scanning data and to generate scanning output signals characterizing a parameter of the combustion process;
   (e) inputting the scanning output signal to the decision analysis computer;
   (f) operating the decision analysis computer to additionally analyze the scanning output signal.

7. The method of claim 6 wherein the additional scanning device is infrared camera.

8. The method of claim 6 wherein the additional scanning device is a spectral photodetector.

9. The method of claim 8 wherein the scanning computer processor is a spectral analyzer.

10. The method of claim 1 wherein the act of operating additional sensors to monitor other parameters of the combustion process and to generate sensor outputs that vary in accordance with variations in the combustion process, includes the acts of:
    (a) positioning a temperature sensor so that it can sense the temperature of at least one parameter of the combustion process;
    (b) activating the temperature sensor; and
    (c) generating an output signal indicative the sensed temperature.

11. The method of claim 10 wherein the act of positioning a temperature sensor so that it can sense the temperature of at least one parameter of the combustion process includes the act of mounting the sensor proximate the combustion flame.

12. The method of claim 10 wherein the act of positioning a temperature sensor so that it can sense the temperature of at least one parameter of the combustion process includes the act of mounting the sensor proximate the combustion exhaust.

13. The method of claim 1 wherein the act of operating additional sensors to monitor other parameters of the combustion process and to generate sensor outputs that vary in accordance with variations in the combustion process, includes the acts of:
    (a) positioning a pressure sensor so that it can sense the pressure of at least one parameter of the combustion process;
    (b) activating the pressure sensor; and
    (c) generating an output signal indicative the sensed pressure.

14. The method of claim 13 wherein the act of positioning the pressure sensor so that it can sense the pressure of at least one parameter of the combustion process includes the act of mounting the sensor in the combustion exhaust.

15. The method of claim 13 wherein the act of positioning the pressure sensor so that it can sense the pressure of at least one parameter of the combustion process includes the act of mounting the sensor proximate the combustion flame.

16. The method of claim 1 wherein the act of operating the neural network to process the scanning output signal and to generate a combustion classification signal defining the combustion process includes the acts of:
    (a) processing the scanning output signal in first and second hidden layers of parallel processing elements, which elements are weighted and trained to recognize different flame classification grades; and
    (b) generating an output signal that defines a flame grade classification for the combustion process at the time it was scanned.

17. The method of claim 16 wherein the act of processing the scanning output signal includes analyzing the combustion flame core.

18. The method of claim 16 wherein the act of processing the scanning output signal includes analyzing the combustion fireball.

19. The method of claim 16 wherein the act of processing the scanning output signal includes analyzing the combustion flame propagation over a period of time.

20. The method of claim 1 wherein the act of operating the decision analysis computer to analyze the combustion classification signal and sensor outputs and to generate combustion control signals and includes the acts of:
  (a) programming the decision analysis computer as a fuzzy logic controller with associated fuzzy inference rules established to monitor and adjust a ratio of air to fuel for the combustion process within a predetermined range;
  (b) operating the decision analysis computer to evaluate the combustion classification and sensor outputs in accordance with the programmed fuzzy inference rules to determine whether the ratio of air to fuel needs to be changed to optimize combustion process while also minimizing pollutants, and if so, the amount that the ratio needs to be changed; and
  (c) operating the decision analysis computer to generate combustion control signals defining required changes to the air-to-fuel ratio.

21. The method of claim 20 wherein the act of operating the decision analysis computer to generate combustion control signals defining required changes to the air-to-fuel ratio includes generating signals that alter the flow of air so that it is maintained within a range of defined by a preset minimum and a preset maximum.

22. The method of claim 20 wherein the act of operating the decision analysis computer to generate combustion control signals defining required changes to the air-to-fuel ratio includes generating signals that alter the flow of fuel so that it is maintained within a range defined by a preset minimum and a preset maximum.

23. The method of claim 20 wherein the act of operating the decision analysis computer to generate combustion control signals defining required changes to the air-to-fuel ratio includes generating signals that maintain the air-to-fuel ration with a range defined by a preset minimum and a preset maximum.

24. The method of claim 23 wherein both the flow of air and the flow of fuel are changed within defined minimum and maximum values.

25. The method of claim 1 further comprising the acts of mounting the scanning device on a moveable implement, and controlling the moveable implement so that the scanning device scans different parts of the combustion process.

26. The method of claim 1 wherein the acts of directing and activating the scanning device to scan the combustion process and generate a scanning output signal includes the acts of:
  (a) directing a laser beam at particles of matter produced in the combustion process;
  (b) photoelectrically detecting spectral radiation generated as the laser beam scans the particles of matter; and
  (c) generating the scanning output signal so that it varies in accordance with detected variations in the spectral radiation as the laser beam scans the particles of matters.

27. The method of claim 1 wherein the acts of directing and activating the scanning device to scan the combustion process and generate a scanning output signal includes the acts of:
  (a) directing a laser beam at particles of matter produced in the combustion process;
  (b) photoelectrically detecting fluorescent radiation generated as the laser beam scans the particles of matter; and
  (c) generating the scanning output signal so that it varies in accordance with detected variations in the fluorescent radiation as the laser beam scans the particles of matters.

28. The method in accordance with claim 1 wherein acts (a) through (g) are conducted intermittently.

29. The method of claim 1 wherein the act of operating the decision analysis computer to analyze the combustion classification signal and sensor outputs and to generate combustion control signals and includes the acts of:
  (a) programming the decision analysis computer as a fuzzy logic controller with associated fuzzy inference rules established to monitor and adjust a ratio of air to fuel for the combustion process within a predetermined range designed to both optimize combustion efficiency and minimize resulting pollutants;
  (b) operating the decision analysis computer to evaluate the combustion classification and sensor outputs in accordance with the programmed fuzzy inference rules to determine whether the ratio of air to fuel needs to be changed to optimize combustion process while also minimizing pollutants, and if so, the amount that the ratio needs to be changed; and
  (c) operating the decision analysis computer to generate combustion control signals defining required changes to the air-to-fuel ratio.

30. The method of claim 29 wherein the act of operating the decision analysis computer to generate combustion control signals defining required changes to the air-to-fuel ratio includes generating signals that control a device for treating pollutants.

31. The method of claim 30 wherein the act of generating signals that control a device for treating pollutants includes generating signals to control a catalytic converter.

32. The method of claim 30 wherein the act of generating signals that control a device for treating pollutants includes generating signals to control a plasma generator.

33. The method of claim 30 wherein the act of generating signals that control a device for treating pollutants includes generating signals to control an ultrasonic generator.

34. The method of claim 30 wherein the act of generating signals that control a device for treating pollutants includes generating signals to control an electrostatic precipitator.

35. A method for controlling a combustion process in a reaction chamber comprising:
  (a) scanning the combustion flame and generating scanning signals that vary with variations in the combustion flame;
  (b) detecting spectral radiation emitted by the combustion process, and generating variable spectral information signals which vary with time,
  (c) inputting the scanning signals and spectral information signals to a decision analysis computer having at least a part thereof configured as a fuzzy logic controller with associated fuzzy inference rules defining combustion control actions depending on various combinations of sensor outputs and flame grade classification;
  (d) operating the decision analysis computer to: (i) analyze the scanning signals and spectral information signals in accordance with the fuzzy inference rules to determine appropriate combustion control actions to optimize the efficiency of the combustion process and reduce pollutants; and (ii) generate combustion control signals defining adjustments to at least one combustion parameter; and
  (e) applying the combustion control signals to adjust at least one combustion parameter.

36. A method in accordance with claim 35 wherein the act of detecting spectral radiation emitted by the combustion process includes detecting spectral radiation emitted from matter burning in the combustion process.

37. A method in accordance with claim 35 wherein the act of detecting spectral radiation emitted by the combustion process includes detecting spectral radiation emitted from matter that is not burning in the combustion process.

38. A system for monitoring and controlling parameters of a combustion process taking place within a combustion chamber, comprising:

(a) a scanning device mounted proximate to the combustion chamber in a manner so that it is capable of scanning the combustion process, the scanning device including a detection circuit coupled to an output circuit, and configured to generate electrical scanning signals on the output circuit that vary with variations in the combustion process;

(b) a control circuit coupled to the scanning device and including an initiation circuit that activates the scanning device to begin scanning the combustion;

(c) a plurality of additional sensors configured to monitor other parameters of the combustion process, each sensor including an output circuit that generates sensor outputs that vary in accordance with variations in sensed parameters of the combustion process;

(d) a computer processor having (i) an input coupled to the output of the scanning device, (ii) logic configured as a neural network, and (iii) memory storing a program that, when executed by the network, processes the scanning output signal to generate a combustion classification signal defining a parameter of the combustion process;

(e) a decision analysis computer having (i) an input coupled to the computer processor that receives the combustion classification signals; (ii) logic configured as a fuzzy controller; (iii) memory storing a fuzzy inference rule program that, when executed by the fuzzy controller, analyzes the combustion classification signals and the sensor outputs to determine and generate combustion control signals defining combustion control actions that vary depending on various combinations of sensor outputs and flame grade classification;

(f) a plurality of combustion control devices configured to vary parameters of the combustion process, each combustion control device including a signal input; and (g) wherein the decision analysis computer includes an output coupled to the inputs of the combustion control devices and is configured to communicate the combustion control signals from the fuzzy controller to the combustion control devices to adjust combustion parameters and optimize the combustion process.

* * * * *